(12) United States Patent
Yanagida et al.

(10) Patent No.: US 12,084,022 B2
(45) Date of Patent: Sep. 10, 2024

(54) BRAKE DEVICE FOR VEHICLE

(71) Applicant: DENSO CORPORATION, Kariya (JP)

(72) Inventors: Etsugou Yanagida, Kariya (JP); Kunio Nanba, Kariya (JP); Daisuke Hokuto, Kariya (JP)

(73) Assignee: DENSO CORPORATION, Kariya (JP)

( * ) Notice: Subject to any disclaimer, the term of this patent is extended or adjusted under 35 U.S.C. 154(b) by 88 days.

(21) Appl. No.: 17/861,694

(22) Filed: Jul. 11, 2022

(65) Prior Publication Data

US 2022/0348171 A1  Nov. 3, 2022

Related U.S. Application Data

(63) Continuation of application No. PCT/JP2021/000519, filed on Jan. 8, 2021.

(30) Foreign Application Priority Data

Jan. 13, 2020 (JP) .................................. 2020-003312

(51) Int. Cl.
 *B60T 7/06* (2006.01)
(52) U.S. Cl.
 CPC ...................... *B60T 7/06* (2013.01)
(58) Field of Classification Search
 CPC ............................... B60T 7/06; B60K 26/021
 See application file for complete search history.

(56) References Cited

U.S. PATENT DOCUMENTS

| | | | | | |
|---|---|---|---|---|---|
| 2,164,921 A | * | 7/1939 | Hoff | ...................... | B60W 10/18 74/513 |
| 2,693,716 A | * | 11/1954 | Ludwig | .................... | G05G 5/06 222/509 |
| 2,836,990 A | * | 6/1958 | De Heer | .................. | G05G 7/04 74/513 |
| 4,695,819 A | * | 9/1987 | Bowsher | .................. | G05G 7/04 338/153 |
| 5,309,361 A | * | 5/1994 | Drott | ....................... | B60T 7/042 74/513 |
| 5,819,593 A | * | 10/1998 | Rixon | .................... | B60T 13/586 74/513 |
| 6,298,746 B1 | * | 10/2001 | Shaw | ....................... | G05G 1/30 74/512 |

(Continued)

FOREIGN PATENT DOCUMENTS

| | | |
|---|---|---|
| JP | 2001247020 A | 9/2001 |
| JP | 2018-095197 | 6/2018 |
| JP | 2019-011014 | 1/2019 |

*Primary Examiner* — Thomas C Diaz
(74) *Attorney, Agent, or Firm* — Nixon & Vanderhye P.C.

(57) ABSTRACT

A brake device for a vehicle includes: a brake pedal having a pedal portion and a lever portion that rotates about a rotation axis when the pedal portion is operated; a housing that rotatably supports the lever portion; and a plate member configured to generate a reaction force with respect to the lever portion in response to a stroke amount of the brake pedal. The plate member has a longitudinal surface defined by a side extending in a longitudinal direction of the plate member and a side extending in a width direction of the plate member. The longitudinal surface is arranged so as to face the lever portion. When the pedal portion is operated, the plate member is bent to generate the reaction force.

16 Claims, 22 Drawing Sheets

(56) References Cited

U.S. PATENT DOCUMENTS

| | | | | |
|---|---|---|---|---|
| 6,467,369 B1 * | 10/2002 | Mann | ................... | B60K 26/021 |
| | | | | 74/513 |
| 6,591,710 B1 * | 7/2003 | Shaw | ....................... | G05G 1/30 |
| | | | | 74/513 |
| 11,036,252 B1 * | 6/2021 | McKeefery | .......... | B60K 26/021 |

* cited by examiner

BRAKE DEVICE FOR VEHICLE

CROSS REFERENCE TO RELATED APPLICATION

The present application is a continuation application of International Patent Application No. PCT/JP2021/000519 filed on Jan. 8, 2021, which designated the U.S. and claims the benefit of priority from Japanese Patent Application No. 2020-003312 filed on Jan. 13, 2020. The entire disclosures of all of the above applications are incorporated herein by reference.

TECHNICAL FIELD

The present disclosure relates to a brake device for a vehicle.

BACKGROUND

A vehicle braking device is known. When the brake pedal is depressed, the rod connected to the brake lever presses the piston, and the coil spring arranged between the piston and the housing plate generates a reaction force.

SUMMARY

According to one aspect of the present disclosure, a brake device for a vehicle includes: a brake pedal having a pedal portion and a lever portion that rotates about a rotation axis when the pedal portion is operated; a housing that rotatably supports the lever portion; and a plate member configured to generate a reaction force with respect to the lever portion in response to a stroke amount of the brake pedal. The plate member has a longitudinal surface defined by a side extending in a longitudinal direction of the plate member and a side extending in a width direction of the plate member. The longitudinal surface is arranged so as to face the lever portion. The plate member is bent, when the pedal portion is operated, to generate the reaction force.

BRIEF DESCRIPTION OF DRAWINGS

FIG. 7 is a sectional view of the vehicle brake device when a brake pedal is stepped on.
FIG. 9 is a sectional view of the vehicle brake device when a brake pedal is stepped on.
FIG. 21 is a sectional view of the vehicle brake device when a brake pedal is stepped on.
FIG. 23 is a sectional view of the vehicle brake device when a brake pedal is stepped on.

DESCRIPTION OF EMBODIMENTS

Figure 1:
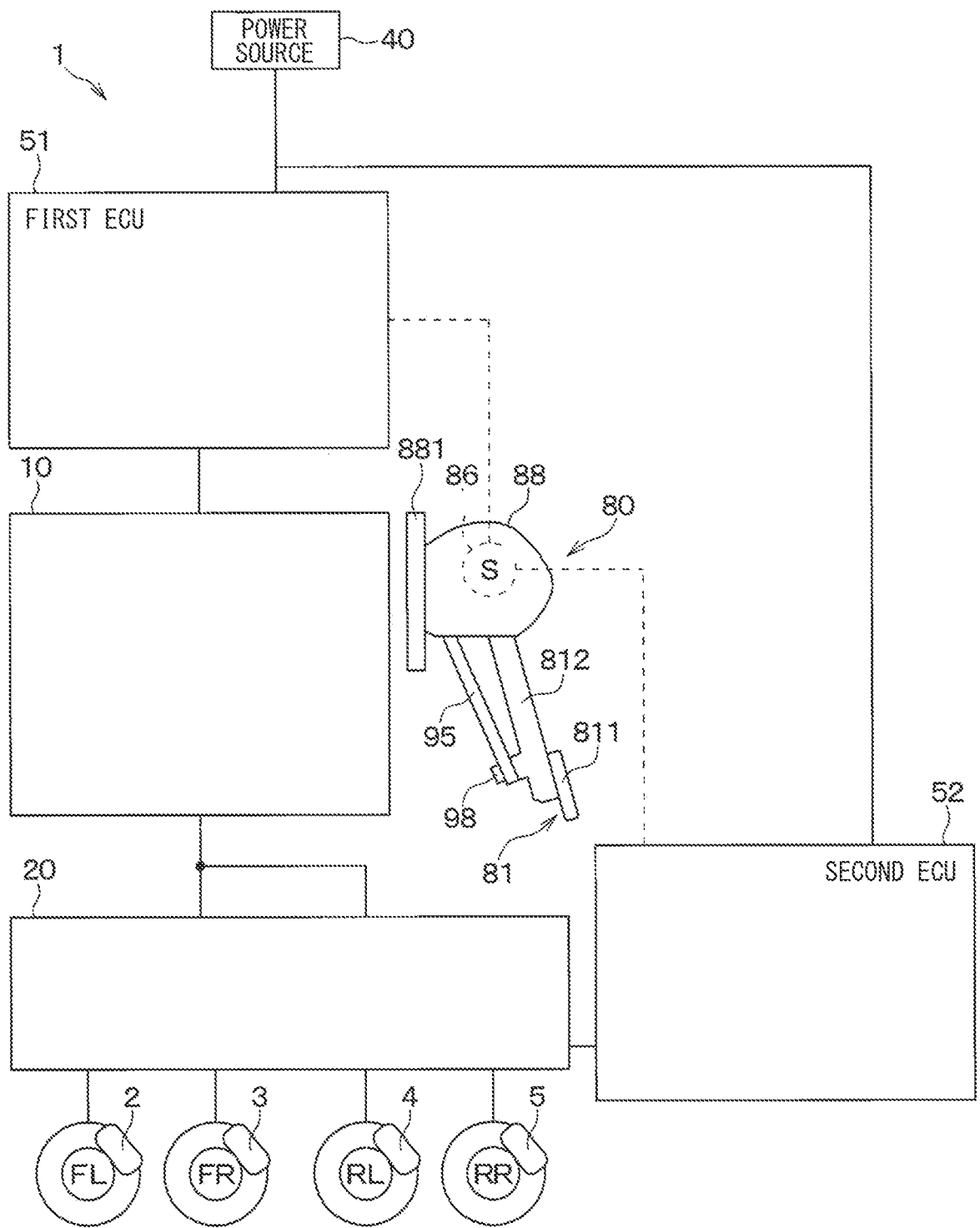
FIG. 1 is a vehicle brake system in which a vehicle brake device according to a first embodiment is used.

To begin with, examples of relevant techniques will be described.

Conventionally, a vehicle braking device is known. In this vehicle braking device, when the brake pedal is depressed, the rod connected to the brake lever presses the piston, and the coil spring arranged between the piston and the housing plate generates a reaction force.

According to the study by the inventors, the vehicle braking device requires the rod that converts the rotary motion of the brake lever into a translational motion in order to expand or contract the coil spring. Therefore, when a coil spring is used, the physique of the vehicle braking device may become large. It is an object of the present disclosure to provide a downsized brake device for a vehicle.

According to one aspect of the present disclosure, a brake device for a vehicle includes: a brake pedal having a pedal portion and a lever portion that rotates about a rotation axis when the pedal portion is operated; a housing that rotatably supports the lever portion; and a plate member configured to generate a reaction force with respect to the lever portion in response to a stroke amount of the brake pedal. The plate member has a longitudinal surface defined by a side extending in a longitudinal direction of the plate member and a side extending in a width direction of the plate member. The longitudinal surface is arranged so as to face the lever portion. The plate member is bent, when the pedal portion is operated, to generate the reaction force.

As a result, the brake device can be downsized.

A reference numeral attached to each component or the like indicates an example of correspondence between the component or the like and specific component or the like described in embodiments below.

Embodiments will be described below with reference to the drawings. In the following embodiments, the same or equivalent parts are denoted by the same reference numerals, and their descriptions will be omitted.

First Embodiment

A vehicle brake device 80 of the first embodiment is used in a vehicle brake system 1 that controls a left front wheel FL, a right front wheel FR, a left rear wheel RL, and a right rear wheel RR of a vehicle 6. First, the vehicle brake system 1 will be described.

As illustrated in FIG. 1, the vehicle brake system 1 includes a left front wheel cylinder, a right front wheel cylinder, a left rear wheel cylinder, and a right rear wheel cylinder. Further, the vehicle brake system 1 includes a first actuator 10, a power supply 40, a first ECU 51, a second actuator 20, a second ECU 52, and the vehicle brake device 80. In the following, for convenience, the wheel cylinder will be referred to as W/C. Further, ECU is an abbreviation for Electronic Control Unit.

The left front W/C 2 is arranged on the left front wheel FL. The right front W/C 3 is arranged on the right front wheel FR. The left rear W/C 4 is arranged on the left rear wheel RL. The right rear W/C 5 is arranged on the right rear wheel RR. Further, the W/C 2 for the left front wheel, the W/C 3 for the right front wheel, the W/C 4 for the left rear wheel, and the W/C 5 for the right rear wheel are connected to each brake pad (not shown) of the vehicle 6.

The first actuator 10 has, for example, a reservoir, a pump, a motor, a pressure sensor, and the like (not shown), and generates brake fluid pressure. Further, the first actuator 10 increases the generated brake fluid pressure. The brake fluid with the increased brake fluid pressure flows to the second actuator 20, which will be described later.

The power supply 40 supplies electric power to the first ECU 51 and the second ECU 52.

The first ECU 51 is mainly composed of a microcomputer or the like, and includes a CPU, a ROM, a RAM, a flash memory, an I/O, and a bus line connecting these configurations. Further, the first ECU 51 controls the first actuator 10 by executing a program stored in the ROM. As a result, the first ECU 51 controls the brake fluid pressure for each of the left front W/C 2, the right front W/C 3, the left rear W/C 4, and the right rear W/C 5. Each of ROM, RAM, and flash memory is non-transitory tangible storage media.

The second actuator 20 has, for example, a differential pressure control valve, a pressure increase control valve, a pressure reducing control valve, a pump, a motor, a pressure sensor, and the like (not shown), and generates brake fluid pressure. Further, the second actuator 20 supplies the brake fluid flowing from the first actuator 10 to each of the left front W/C 2, the right front W/C 3, the left rear W/C 4, and the right rear W/C 5.

The second ECU 52 is mainly composed of a microcomputer or the like, and includes a CPU, a ROM, a RAM, a flash memory, an I/O, and a bus line connecting these configurations. Further, the second ECU 52 controls the second actuator 20 by executing a program stored in the ROM. As a result, the second ECU 52 controls the brake fluid pressure for each of the left front W/C 2, the right front W/C 3, the left rear W/C 4, and the right rear W/C 5. Each of ROM, RAM, and flash memory is non-transitory tangible storage media.

Figure 2:
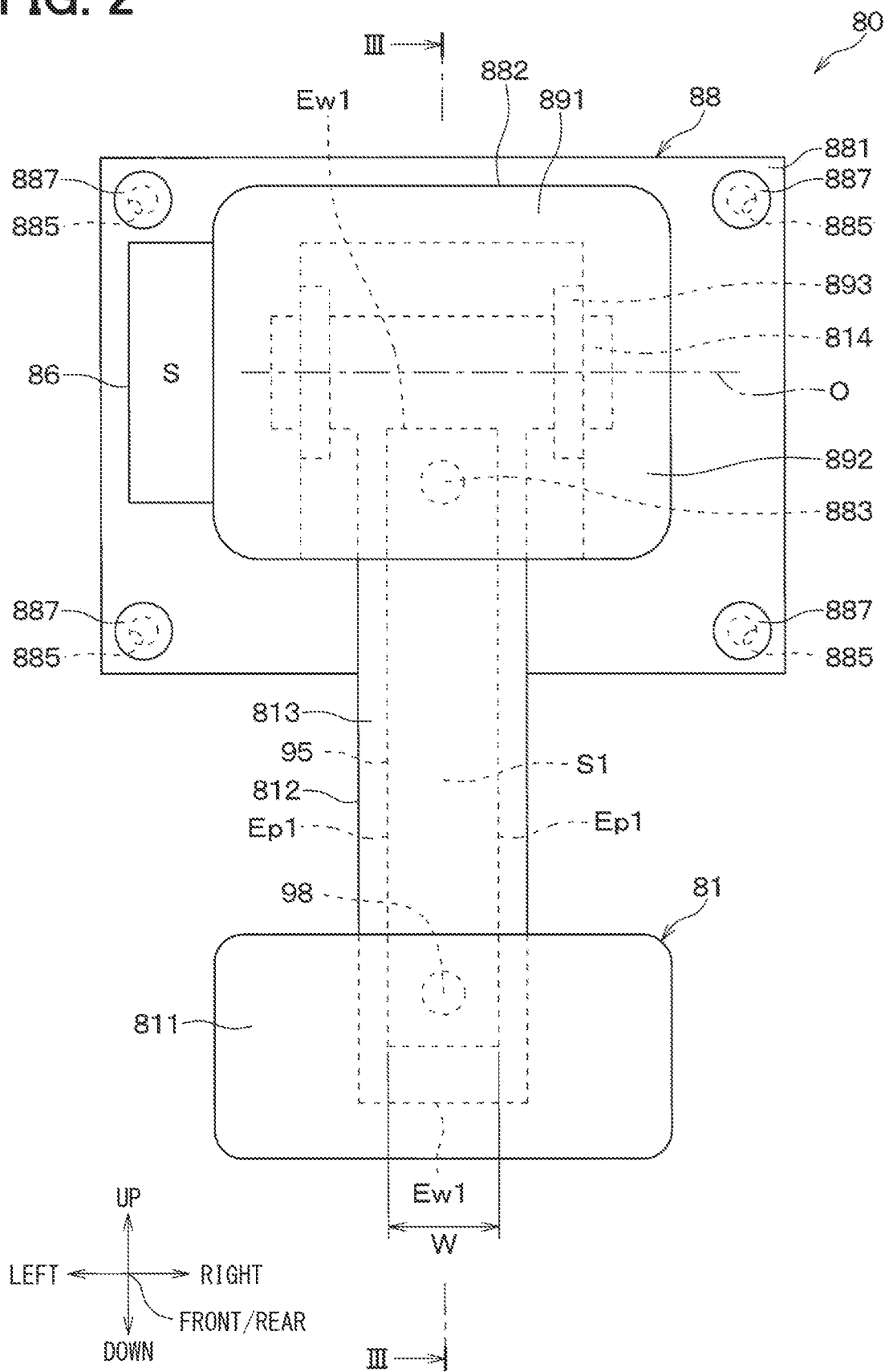
FIG. 2 is a front view illustrating the vehicle brake device.
Figure 3:
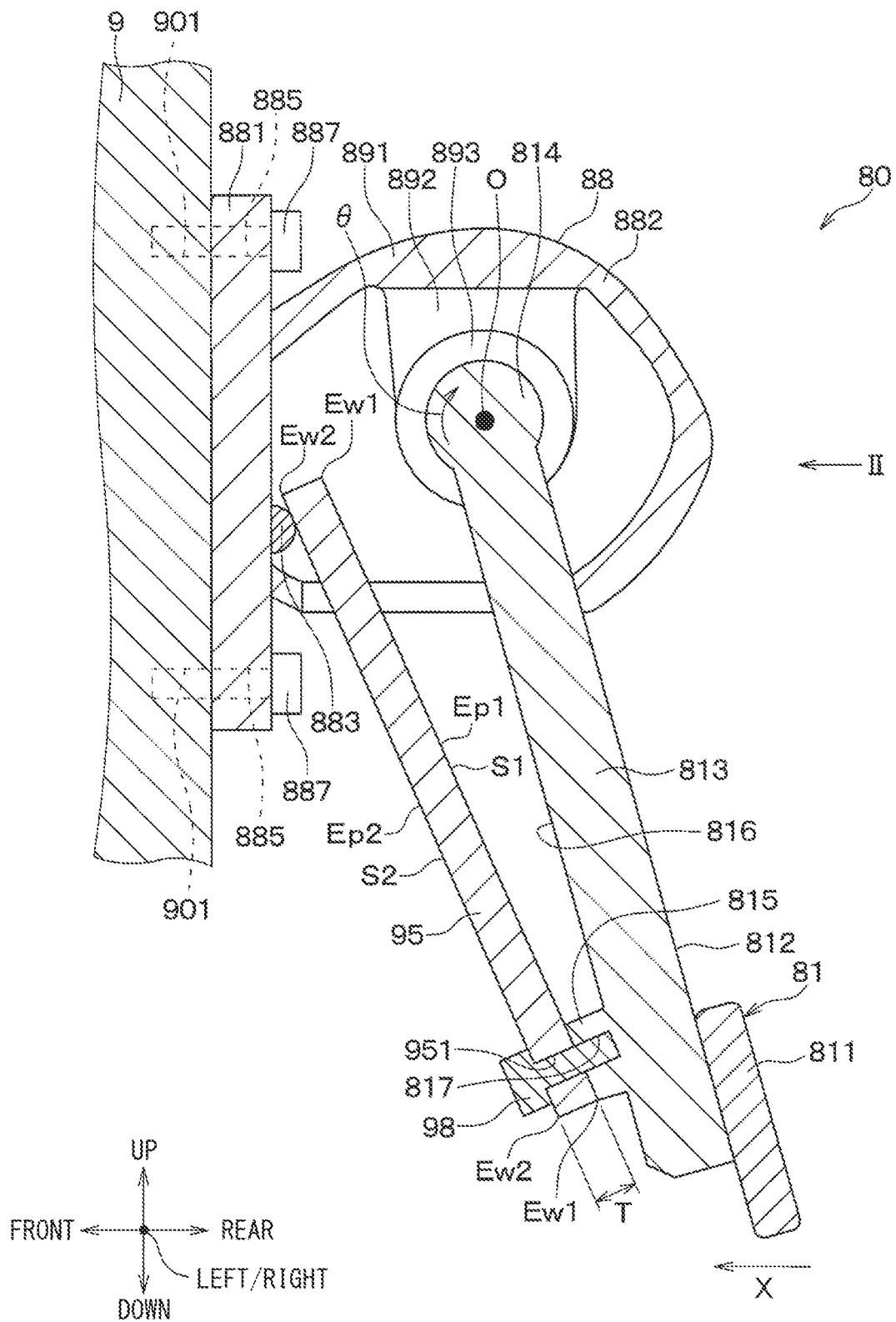
FIG. 3 is a cross-sectional view taken along a line III-III in FIG. 2.

As shown in FIGS. 2 and 3, the vehicle brake device 80 includes a brake pedal 81, a stroke sensor 86, a housing 88, a plate member 95, and a lever fixing portion 98.

The brake pedal 81 has a pedal portion 811 and a lever portion 812.

The pedal portion 811 is operated by being stepped on by the driver of the vehicle 6.

As shown in FIG. 3, the lever portion 812 includes a lever plate portion 813, a lever rotating portion 814, and a lever convex portion 815.

The lever plate portion 813 is formed in a plate shape and is connected to the pedal portion 811. The lever plate portion 813 includes a lever front surface 816. The lever front surface 816 is a front surface of the lever plate portion 813 opposite to the pedal portion 811. The lever front surface 816 is connected to the lever convex portion 815, which will be described later.

The lever rotating portion 814 is formed in a columnar shape and is connected to the lever plate portion 813. The lever plate portion 813 is connected to the pedal portion 811. As a result, the lever rotating portion 814 rotates about a rotation axis O when the pedal portion 811 is stepped on by the driver of the vehicle 6.

The lever convex portion 815 is connected to the lever front surface 816 of the lever plate portion 813. The lever convex portion 815 projects toward the lower side of the plate member 95 from the lever front surface 816. The lever convex portion 815 projects forward from the lever front surface 816. The lever convex portion 815 has a lever hole 817 into which the lever fixing portion 98 is inserted.

Figure 4:
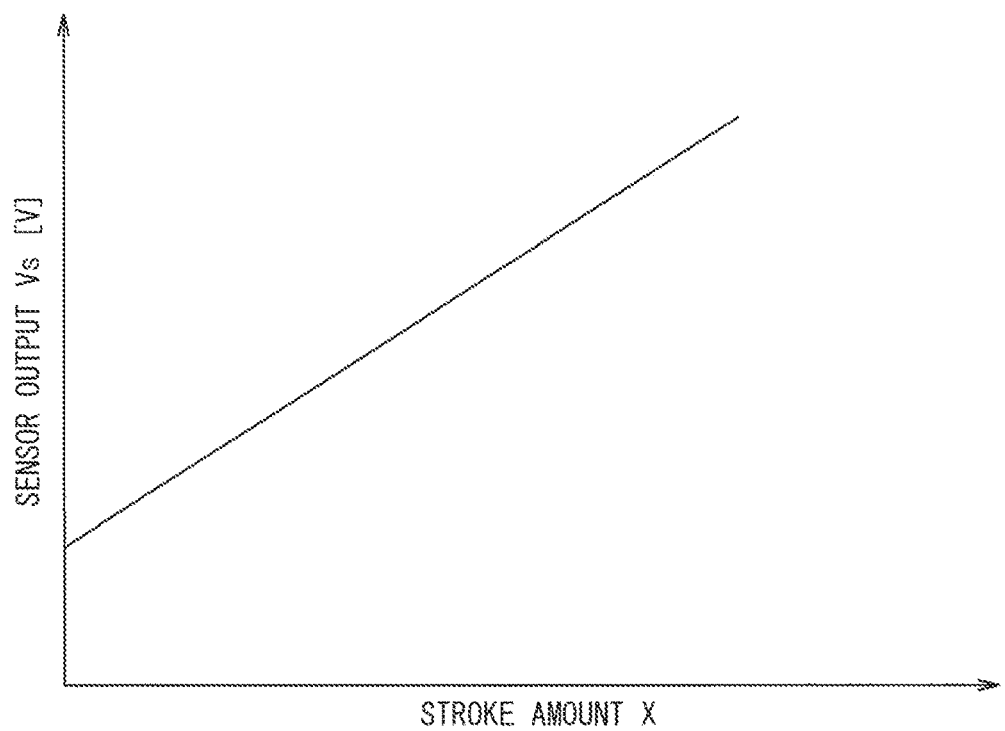
FIG. 4 is a diagram illustrating a relationship between a stroke amount and a sensor output.

As shown in FIG. 2, the stroke sensor 86 is placed, for example, on the rotation axis O of the lever portion 812. As shown in FIG. 1, the stroke sensor 86 outputs a signal corresponding to the stroke amount X, which is the operation amount of the brake pedal 81 by the pedaling force of the driver of the vehicle 6, to the first ECU 51 and the second ECU 52. The stroke amount X is, for example, as shown in FIG. 3, the translational movement amount of the pedal portion 811 toward the front of the vehicle 6. Further, as shown in FIG. 4, the stroke amount X and the sensor output Vs of the stroke sensor 86 are adjusted so as to have a linear relationship. The sensor output Vs is, for example, a voltage. The stroke sensor 86 may output a signal corresponding to the rotation angle θ around the rotation axis O of the lever portion 812 to the first ECU 51 and the second ECU 52. In this case, the rotation angle θ and the signal of the stroke sensor 86 are adjusted so as to have a linear relationship similar to the relationship between the stroke amount X and the sensor output Vs.

Figure 5:
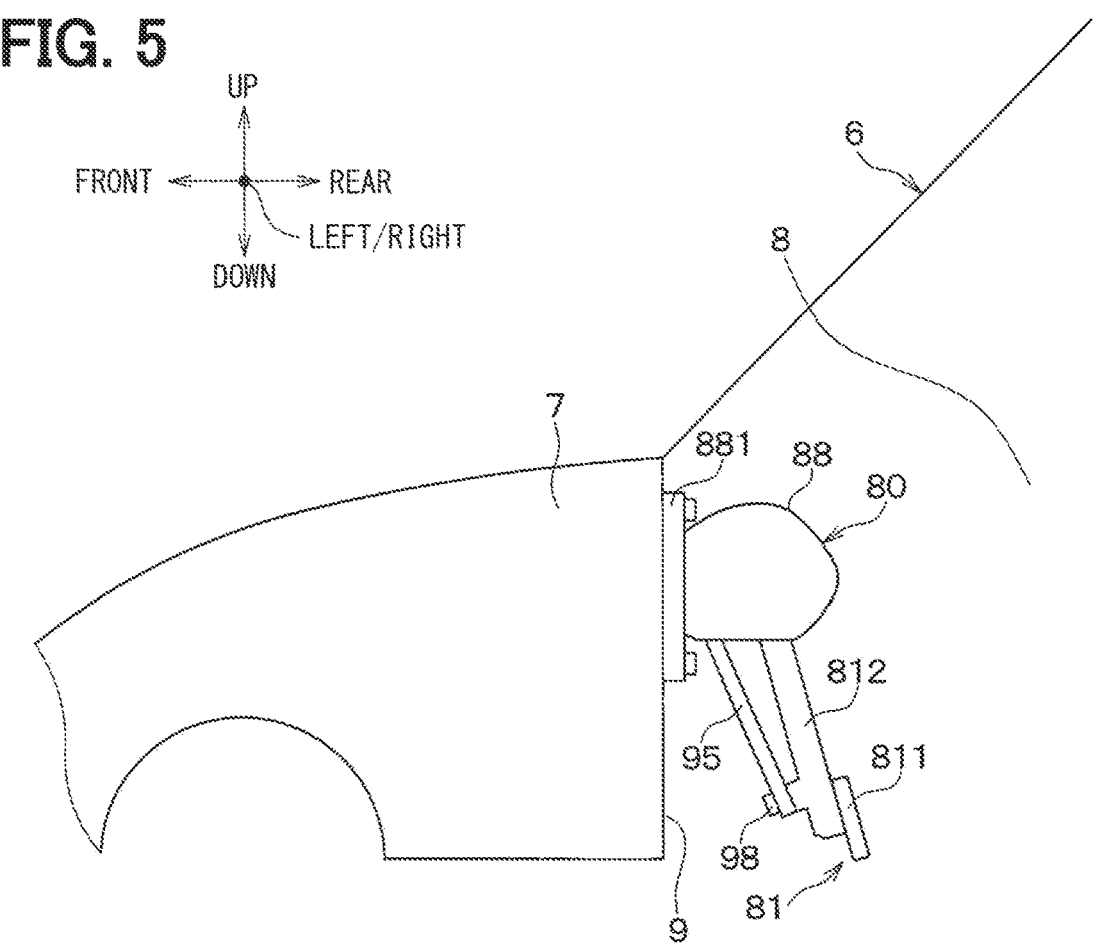
FIG. 5 is a view illustrating the vehicle brake device attached to a vehicle.

As illustrated in FIGS. 3 and 5, the housing 88 is attached to a dash panel 9, which is a partition wall separating a cabin 8 from an outside compartment 7 such as an engine compartment of the vehicle 6. The dash panel 9 may be referred to as a bulkhead. Not only an engine of the vehicle 6 but also a battery, an air conditioner, and the like of the vehicle 6 are disposed in the outside compartment 7.

As shown in FIG. 3, the housing 88 has a panel mounting portion 881, a panel bolt 887, a housing portion 882, and a housing contact portion 883. For convenience, the up side with respect to the front of the vehicle 6 will be simply referred to as the up side. The down side with respect to the front of the vehicle 6 will be simply referred to as the down side.

The panel mounting portion 881 is formed in a plate shape, for example, and extends in the up-down direction and the left-right direction as shown in FIG. 2. The panel mounting portion 881 has panel mounting holes 885. As shown in FIGS. 2 and 3, the panel mounting portion 881 is attached to the dash panel 9 by inserting the panel bolts 887 into the panel mounting holes 885 and the panel holes 901 of the dash panel 9. The panel bolt 887 is inserted so as not to penetrate the dash panel 9.

The housing portion 882 is formed in a bottomed cylindrical shape, and rotatably houses a part of the lever portion 812 of the brake pedal 81 adjacent to the rotation axis O. Specifically, the housing portion 882 includes a housing bottom 891, a housing cylinder portion 892 and two bearing portions 893.

The housing bottom 891 is connected to the panel mounting portion 881.

As shown in FIG. 2, the housing cylinder portion 892 is connected to the housing bottom 891 and extends downward from the housing bottom 891. Both ends of the lever rotating portion 814 are inserted into holes (not shown) of the housing cylinder portion 892, so that the both ends of the lever rotating portion 814 are connected to the housing cylinder portion 892. As a result, the housing cylinder portion 892 rotatably supports the lever rotating portion 814.

The bearing portion 893 includes a bearing hole (not shown). A part of the lever rotating portion 814 is inserted into the bearing hole, such that the bearing portion 893 rotatably supports the lever rotating portion 814 together with the housing cylinder portion 892.

As shown in FIG. 3, the housing contact portion 883 is arranged in the housing 88, and is formed separately from the panel mounting portion 881 and the housing portion 882. The housing contact portion 883 is connected to the panel mounting portion 881. The housing contact portion 883 projects from the panel mounting portion 881 toward the upper side of the plate member 95. The housing contact portion 883 projects rearward from the panel mounting portion 881. As a result, the housing contact portion 883 comes into contact with the upper side of the plate member 95, in the initial state before the pedal portion 811 is operated.

The plate member 95 is a leaf spring and is formed in the shape of a cuboid plate. The width direction of the plate member 95 coincides with the left-right direction. The thickness direction of the plate member 95 is orthogonal to the longitudinal direction of the plate member 95 and the width direction of the plate member 95, along the operation direction of the pedal portion 811. The lower side of the plate member 95 has a lower hole 951 into which the lever fixing portion 98 is inserted.

The width of the plate member 95 is defined as a plate width W. The thickness of the plate member 95 is defined as a plate thickness T. The length of the plate member 95 in the longitudinal direction is larger than the plate width W. The plate width W is larger than the plate thickness T. The plate member 95 is formed so that the plate thickness T is constant. It is assumed that the plate thickness T is constant when the difference between the maximum value of the plate thickness T of the plate member 95 and the minimum value of the plate thickness T of the plate member 95 is 1 mm or less.

The plate member 95 is arranged between the inner surface of the housing 88 and the lever portion 812 of the brake pedal 81. Specifically, the plate member 95 is arranged between the housing contact portion 883 and the lever front surface 816.

The plate member 95 has a first longitudinal surface S1 defined by a first longitudinal side Ep1 of the plate member 95 extending in the longitudinal direction and a first width side Ew1 of the plate member 95 extending in the width direction. The plate member 95 has a second longitudinal surface S2 defined by a second longitudinal side Ep2 of the plate member 95 extending in the longitudinal direction and a second width side Ew2 of the plate member 95 extending in the width direction. The second longitudinal surface S2 is an opposite surface of the plate member 95 opposite from the first longitudinal surface S1.

The first longitudinal surface S1 is located on the rear side of the plate member 95. As a result, the first longitudinal surface S1 faces the lever front surface 816. As shown in FIG. 2, the size of the lever front surface 816 is larger than the size of the first longitudinal surface S1. The first longitudinal surface S1 is located within a range in which the lever front surface 816 is projected in the operating direction of the pedal portion 811.

As shown in FIG. 3, the second longitudinal surface S2 is located on the front side of the plate member 95. As a result, the second longitudinal surface S2 faces the inside of the housing 88. Specifically, the second longitudinal surface S2 faces the housing contact portion 883 and the panel mounting portion 881.

The lever fixing portion 98 fixes the lower side of the plate member 95 and the lever convex portion 815. Specifically, the lever fixing portion 98 is a bolt or the like, and is inserted into the lower hole 951 of the plate member 95 and the lever hole 817 of the lever convex portion 815. As a result, the lower side of the plate member 95 and the lever convex portion 815 are fixed. The lever fixing portion 98 is not limited to the bolt, and may be, for example, a welded portion, a deposition portion, an adhesive portion, or the like. Therefore, the lower side of the plate member 95 and the lever convex portion 815 may be fixed by welding, deposition, adhesion, or the like.

Figure 6:
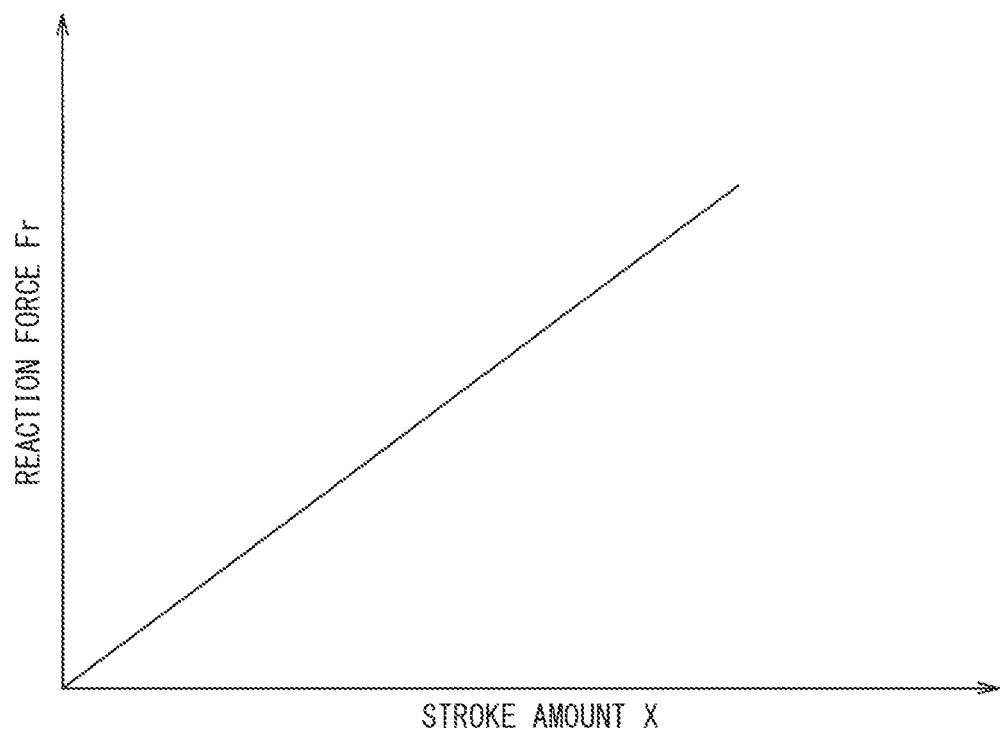
FIG. 6 is a diagram illustrating a relationship between a stroke amount and a reaction force.

The upper side of the plate member 95 and the housing contact portion 883 come into contact with each other. Therefore, the plate member 95 is a cantilever beam having a fixed end on the lower side of the plate member 95 and a free end on the upper side of the plate member 95. Therefore, when the brake pedal 81 is operated by the pedaling force of the driver of the vehicle 6, the plate member 95 receives a load in the thickness direction of the plate member 95 from the housing contact portion 883 that contacts the plate member 95. As a result, the plate member 95 elastically deforms while the upper side of the plate member 95 slides along the outer surface of the housing contact portion 883. That is, the plate member 95 bends. Therefore, a restoring force is generated in the plate member 95. Due to this restoring force, a reaction force Fr with respect to the lever portion 812 is generated. Further, the restoring force due to the deflection of the plate member 95 is proportional to the amount of deflection of the plate member 95. Further, the amount of deflection of the plate member 95 is proportional to the stroke amount X. Therefore, the restoring force due to the deflection of the plate member 95 is proportional to the stroke amount X. Therefore, the stroke amount X and the reaction force Fr have a linear relationship as shown in FIG. 6. The amount of change in the reaction force Fr with respect to the stroke amount X is set by the flexural rigidity of the plate member 95. The flexural rigidity is a product of the Young's modulus of the plate member 95 and the moment of inertia of area of the plate member 95. Further, since the plate member 95 is formed in the shape of a cuboid plate as described above, the cross section of the plate member 95 in the direction of receiving the load is rectangular. Further, since the first longitudinal surface S1 faces the lever front surface 816, the load direction applied to the plate member 95 from the housing contact portion 883 is along the thickness direction of the plate member 95. Therefore, this moment of inertia of area is proportional to the plate width W. Further, the moment of inertia of area of the plate member 95 is proportional to the cube of the plate thickness T.

The vehicle brake system 1 is configured as described above.

Next, an operation of the vehicle brake system 1 will be described.

Figure 7:
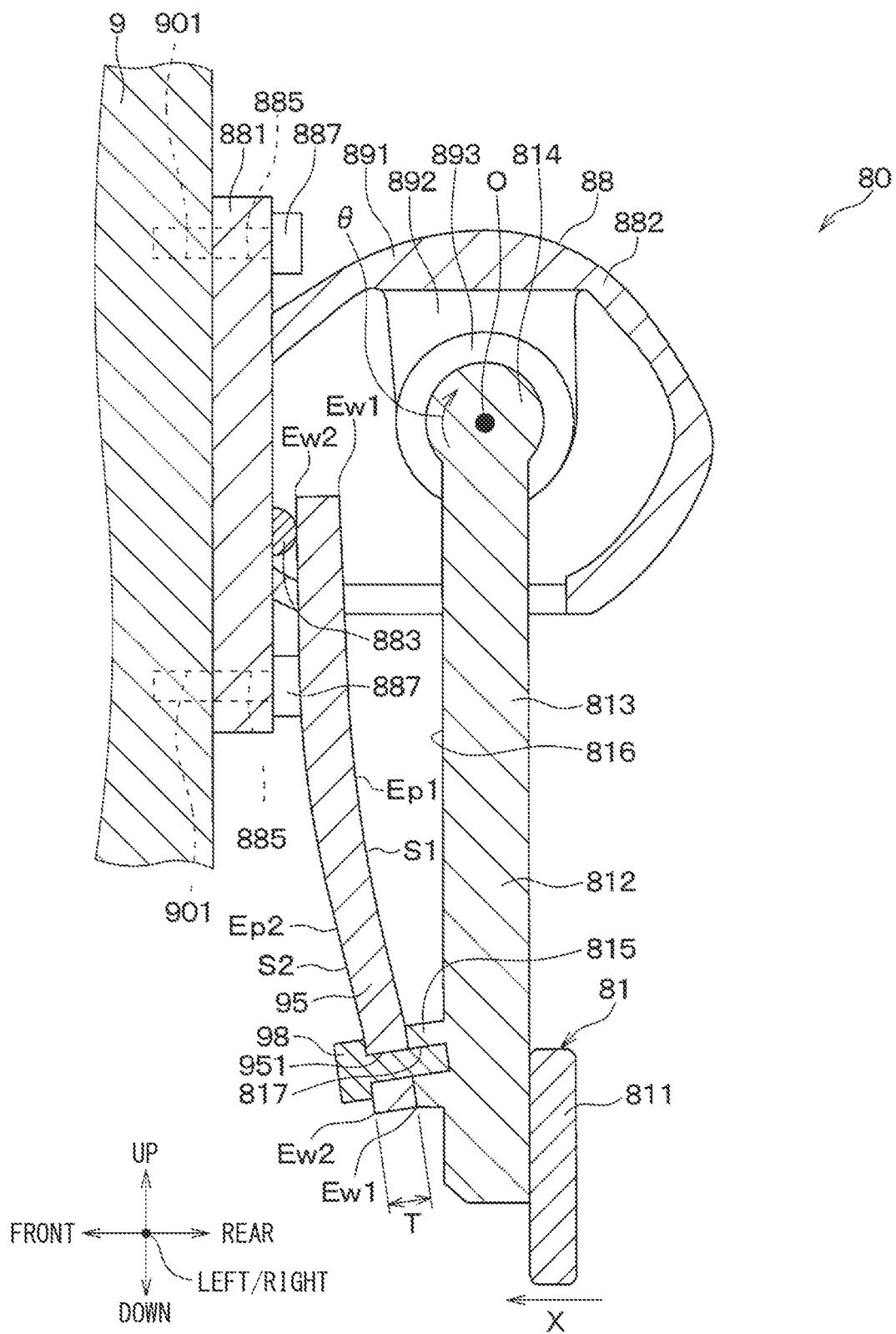

For example, as shown in FIG. 7, when the pedal portion 811 is stepped on by the driver of the vehicle 6 from the initial state, the lever portion 812 rotates about the rotation axis O. As a result, the stroke amount X becomes large, so that the sensor output Vs becomes large. At this time, the first ECU 51 acquires the sensor output Vs from the stroke sensor 86. Further, the first ECU 51 controls the first actuator 10 so that the hydraulic pressure of the brake fluid flowing from the first actuator 10 to the second actuator 20 increases in order to decelerate the vehicle 6 based on the acquired sensor output Vs. As a result, the brake fluid having a relatively high hydraulic pressure flows from the first actuator 10 to the second actuator 20.

Since the plate member 95 is a cantilever beam, the plate member 95 bends when the stroke amount X becomes large. As a result, a reaction force Fr is generated by the restoring force due to the deflection of the plate member 95. This reaction force Fr causes the brake pedal 81 to return to the initial position when a foot of the driver of the vehicle 6 is removed from the pedal portion 811.

Further, when the pedal portion 811 is stepped on by the driver of the vehicle 6, the second ECU 52 performs normal control, ABS control, VSC control, and the like. ABS is an abbreviation for Antilock Brake System. VSC is an abbreviation for Vehicle stability control.

For example, the second ECU 52 controls the second actuator 20 in order to decelerate the vehicle 6 in the normal control which is the brake control by the driver of the vehicle 6 operating the brake pedal 81. As a result, the second actuator 20 uses the brake fluid flowing from the first actuator 10 to the second actuator 20 for the left front W/C 2, the right front W/C 3, the left rear W/C 4, and the right rear W/C 5. Thus, each brake pad (not illustrated) comes into frictional contact with the corresponding brake disc. Thus, the wheel corresponding to each brake disc is decelerated, and the vehicle 6 decelerates. Thus, the vehicle 6 stops.

Further, for example, the second ECU 52 acquires each wheel speed and vehicle speed of the vehicle 6 from a sensor (not shown). Further, the second ECU 52 calculates each slip ratio of the left front wheel FL, the right front wheel FR, the left rear wheel RL, and the right rear wheel RR based on the acquired wheel speed and vehicle speed. Then, the second ECU 52 determines whether or not to execute the ABS control based on this slip ratio. Further, when the ABS control is executed, the second ECU 52 performs one of the depressurization mode, the holding mode, and the pressure increasing mode according to the slip ratio. In the depressurization mode, the pressure boost control valve (not shown) of the second actuator 20 corresponding to the control target wheel is turned off, and the decompression control valve (not shown) of the second actuator 20 is appropriately communicated. Thus, the pressure of the W/C corresponding to the target wheel is reduced. In the holding mode, the pressure of the W/C corresponding to the controlled target wheel is held by shutting off the pressure increasing control valve and the depressurizing control valve of the second actuator 20 corresponding to the controlled target wheel (not shown). In the pressure boosting mode, the pressure reducing control valve (not shown) of the second actuator 20 corresponding to the control target wheel is turned off, and the pressure boosting control valve (not shown) of the second actuator 20 is appropriately communicated. As a result, the pressure of the W/C corresponding to the controlled wheel increases. In this way, since the slip ratio of each wheel of the vehicle 6 is controlled, it is possible to restrict the left front wheel FL, the right front wheel FR, the left rear wheel RL, and the right rear wheel RR from being locked.

For example, the second ECU 52 acquires the yaw rate, steering angle, acceleration, each wheel speed, and vehicle speed of the vehicle 6 from a sensor (not shown). Further, the second ECU 52 calculates the skid state of the vehicle 6 based on the acquired yaw rate, steering angle, acceleration, each wheel speed, vehicle speed, and the like. Then, the second ECU 52 determines whether or not to execute the VSC control based on the skid state of the vehicle 6. Further, when the second ECU 52 executes the VSC control, the second ECU 52 selects a control target wheel for stabilizing the turning of the vehicle 6 based on the side slip state of the vehicle 6. Further, the second ECU 52 controls the second actuator 20 so that the pressure of the W/C corresponding to the selected controlled target wheel increases. As a result, the brake fluid pressure of the W/C corresponding to the controlled target wheel increases, so that the side slip of the vehicle 6 is suppressed. Thus, traveling of the vehicle 6 is stabilized.

In this way, the second ECU 52 performs normal control, ABS control, VSC control, and the like. At this time, in addition to the normal control, ABS control, and VSC control, the second ECU 52 may perform collision avoidance control, regenerative cooperative control, and the like based on signals from other ECUs (not shown).

The vehicle brake system 1 operates as described above. The vehicle brake device 80 provided in the vehicle brake system 1 can be downsized. Hereinafter, the miniaturization of the vehicle brake device 80 will be described.

In the vehicle brake device 80, the first longitudinal surface S1 defined by the first longitudinal side Ep1 extending in the longitudinal direction of the plate member 95 and the first width side Ew1 extending in the width direction of the plate member 95 opposes the lever front surface 816. As a result, the thickness direction of the plate member 95 is along the operating direction of the pedal portion 811 and the direction in which the plate member 95 receives the load. Further, as described above, the moment of inertia of area of the plate member 95 in this case is proportional to the cube of the plate thickness T. Therefore, the distance from the plate member 95 to the lever portion 812 can be made relatively small while generating a relatively large reaction force Fr by the plate member 95, so that the vehicle brake device 80 can be made smaller.

The vehicle brake device 80 also has effects as described below.

[1] In the vehicle brake device 80, the housing 88 is disposed in the cabin 8 relative to the dash panel 9 separating the cabin 8 from the outside compartment 7 of the vehicle 6. This eliminates the need to connect to a master cylinder or the like in the engine room. As a result, the flexibility in the mounting position of the vehicle brake device 80 is relatively high.

[2] As described in a comparison example such as JP 2018-95197 A, a brake pedal is known in which a V-shaped leaf spring is attached to a rotating pin. In this brake pedal, the V-shaped leaf spring and the rotating pin slide, so the coefficient of friction between the V-shaped leaf spring and the rotating pin may change due to wear of the V-shaped leaf spring and the rotating pin. Therefore, the accuracy of the operation amount of the brake pedal and the reaction force associated therewith may decrease.

In the vehicle brake device 80, the lower side of the plate member 95 is fixed on the lever convex portion 815 of the lever portion 812 located opposite from the lever rotating portion 814 by the lever fixing portion 98. Further, the upper side of the plate member 95 and the housing contact portion 883 are in contact with each other. As a result, the reaction force Fr is generated by the bending of the plate member 95. At this time, since the plate member 95 and the lever rotating portion 814 do not rub against each other, the plate member 95 and the lever rotating portion 814 do not wear without the friction between the plate member 95 and the lever rotating portion 814. Therefore, the decrease in the accuracy of the reaction force Fr due to the wear of the plate member 95 and the lever rotating portion 814 is suppressed. Therefore, in the vehicle brake device 80, the accuracy of the reaction force Fr is improved.

[3] In another comparison example, the body size of the coil spring may be increased in order to relatively increase the reaction force of the coil spring.

In the vehicle brake device 80, the plate member 95 is a cantilever beam having a fixed end on the lower side of the plate member 95 and a free end on the upper side of the plate member 95. As a result, when the brake pedal 81 is operated by the pedaling force of the driver of the vehicle 6, the plate member 95 bends, so that a relatively large reaction force Fr can be generated.

[4] The first longitudinal surface S1 is located within the range in which the lever front surface 816 is projected in the operating direction of the pedal portion 811. As a result, the plate member 95 is smaller than the brake pedal 81, so that when the brake pedal 81 is operated by the pedaling force of the driver of the vehicle 6, the plate member 95 is restricted from erroneously stepped on by the driver of the vehicle 6. Therefore, damage to the brake pedal 81 and the plate member 95 is suppressed.

[5] The plate member 95 is arranged between the lever front surface 816 of the lever plate portion 813 opposite to the pedal portion 811 and the housing contact portion 883. As a result, the plate member 95 is located on the side of the lever plate portion 813 opposite to the pedal portion 811. Therefore, when the brake pedal 81 is operated by the pedaling force of the driver of the vehicle 6, the plate member 95 is restricted from accidentally stepped by the driver of the vehicle 6. Therefore, damage to the brake pedal 81 and the plate member 95 is suppressed.

[6] The plate member 95 is formed so that the plate thickness T is constant. As a result, the plate member 95 can be attached to the lever portion 812 from any orientation in the thickness direction of the plate member 95, so that the assembly failure of the vehicle brake device 80 is suppressed. As described above, the plate thickness T is assumed to be constant when the difference between the maximum value of the plate thickness T of the plate member 95 and the minimum value of the plate thickness T of the plate member 95 is 1 mm or less.

[7] The housing contact portion 883 is formed separately from the panel mounting portion 881 and the housing portion 882. As a result, the strength of the housing contact portion 883 can be made relatively high, so that the housing contact portion 883 is less likely to be destroyed.

[8] The plate width W of the plate member 95 is larger than the plate thickness T of the plate member 95. As described above, the moment of inertia of area of the plate member 95 is proportional to the plate width W. Therefore, since the plate width W of the plate member 95 is relatively large, the stress applied to the plate member 95 is relatively small, and the plate member 95 can cause a relatively large reaction force Fr and a relatively large amount of deflection at the same time.

Second Embodiment

In the second embodiment, the brake pedal 81, the housing 88, and the plate member 95 are different from those in the first embodiment. Further, the vehicle brake device 80 does not include the lever fixing portion 98, but includes a housing fixing portion 99. Other than those, the present embodiment is similar to the first embodiment.

Figure 8:
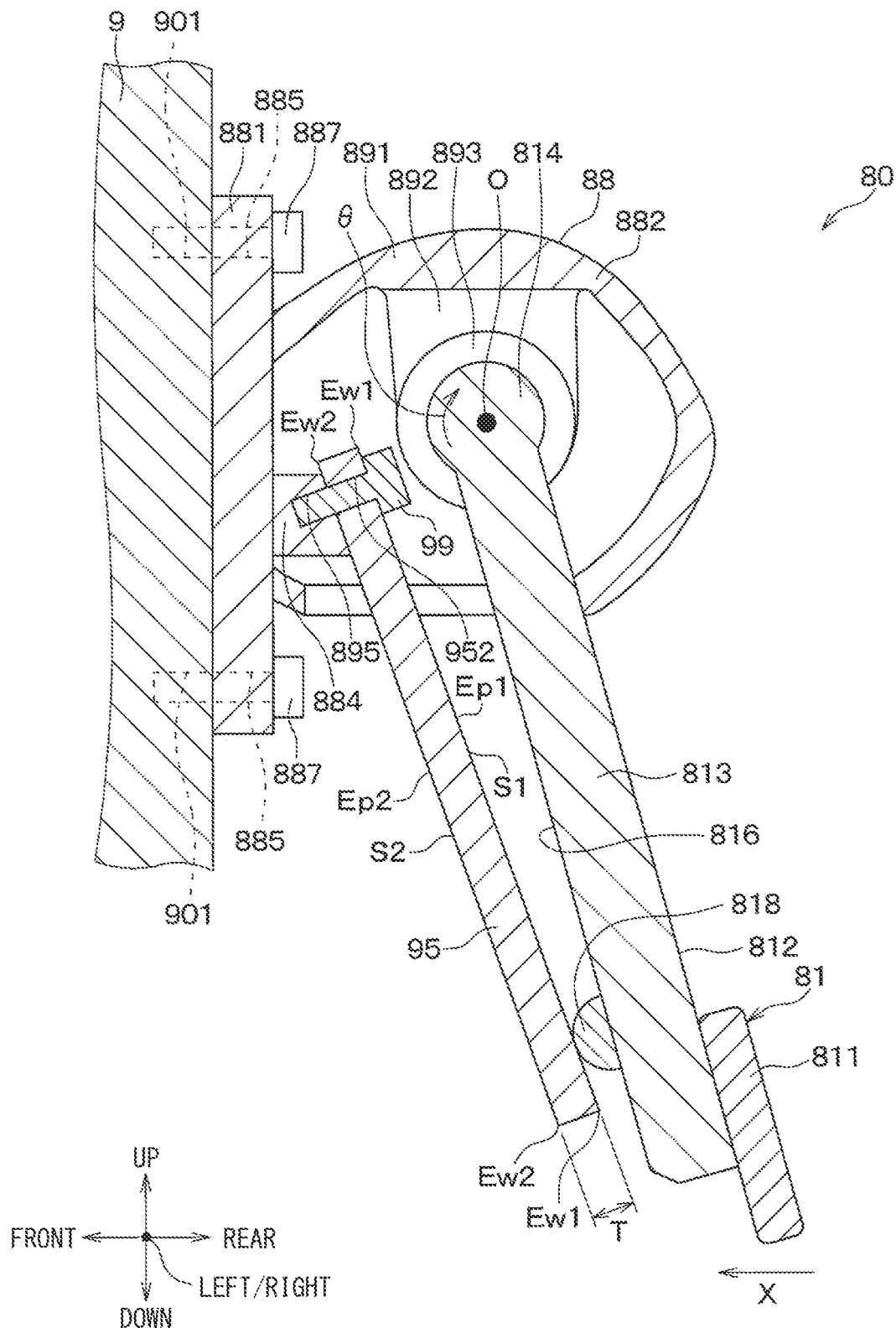
FIG. 8 is a sectional view illustrating a vehicle brake device according to a second embodiment.

As shown in FIG. 8, the lever portion 812 of the brake pedal 81 includes the lever plate portion 813 and the lever rotating portion 814, as described above. Further, the lever portion 812 does not include the lever convex portion 815, but includes the lever contact portion 818.

The lever contact portion 818 is formed separately from the lever plate portion 813 and the lever rotating portion 814. Further, the lever contact portion 818 is connected to the lower side of the lever front surface 816 of the lever plate portion 813. Further, the lever contact portion 818 projects from the lever front surface 816 toward the lower side of the plate member 95. The lever contact portion 818 projects from the lever front surface 816 toward the front side. As a result, the lever contact portion 818 comes into contact with the lower side of the plate member 95. Here, in the initial state before the pedal portion 811 is operated, the lever contact portion 818 is in contact with the lower side of the plate member 95.

The housing 88 has the panel mounting portion 881 and the housing portion 882, as described above. Further, the housing 88 does not have the housing contact portion 883, but has a housing convex portion 884.

The housing convex portion 884 is connected to the panel mounting portion 881. Further, the housing convex portion 884 projects from the panel mounting portion 881 toward the upper side of the plate member 95, and here, toward the rear side from the panel mounting portion 881. Further, the housing convex portion 884 includes a housing hole 895 into which the housing fixing portion 99 described later is inserted.

The plate member 95 does not have the lower hole 951 but has an upper hole 952. The housing fixing portion 99, which will be described later, is inserted into the upper hole 952.

The housing fixing portion 99 fixes the upper side of the plate member 95 and the housing convex portion 884. Specifically, the housing fixing portion 99 is a bolt or the like, and is inserted into the upper hole 952 of the plate member 95 and the housing hole 895 of the housing convex portion 884. As a result, the upper side of the plate member 95 and the housing convex portion 884 are fixed. The housing fixing portion 99 is not limited to bolts and the like, and may be, for example, a welded portion, a deposition portion, an adhesive portion, or the like. Therefore, the upper side of the plate member 95 and the housing convex portion 884 may be fixed by welding, deposition, adhesion, or the like.

Figure 9:
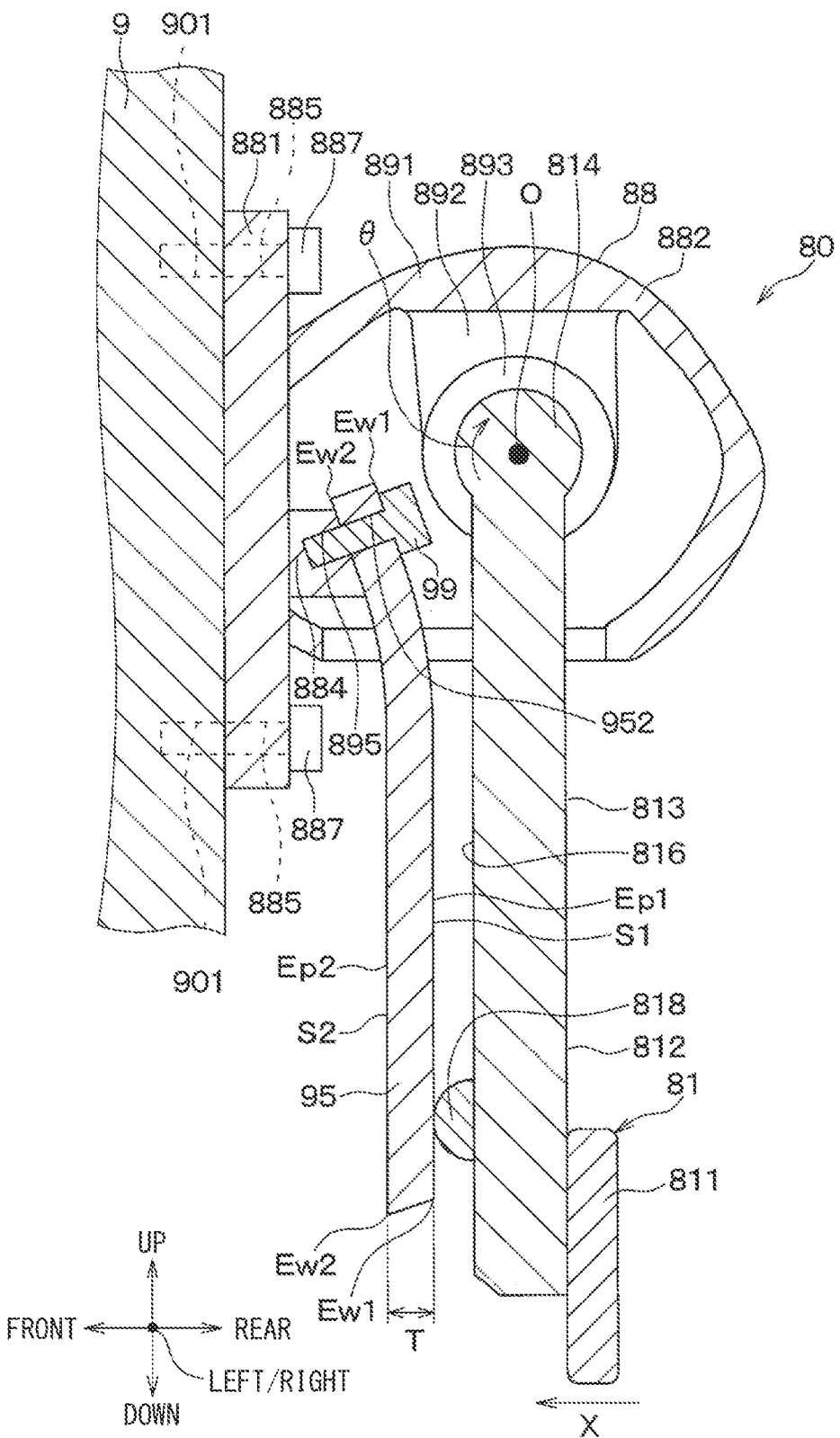

The lower side of the plate member 95 and the lever contact portion 818 come into contact with each other. Therefore, the plate member 95 is a cantilever beam having the upper side of the plate member 95 as a fixed end and the lower side of the plate member 95 as a free end. Therefore, as shown in FIG. 9, when the brake pedal 81 is operated by the pedaling force of the driver of the vehicle 6, the plate member 95 receives a load in the thickness direction of the plate member 95 from the lever contact portion 818 that contacts the plate member 95. As a result, the plate member 95 bends while the lower side of the plate member 95 slides along the outer surface of the lever contact portion 818. Therefore, a restoring force is generated in the plate member 95. Due to this restoring force, a reaction force Fr with respect to the lever portion 812 is generated. As a result, similarly to the above, the stroke amount X and the reaction force Fr have a linear relationship.

The second embodiment also achieves the same effects as achieved by the first embodiment. Since the housing 88 is attached to the dash panel 9, the rigidity of the housing 88 is relatively high. Further, in the second embodiment, since the upper side of the plate member 95 and the housing convex portion 884 of the housing 88 are fixed, the rigidity of the plate member 95 is relatively high. Therefore, since the natural frequency of the plate member 95 becomes relatively large, the vibration resistance of the plate member 95 is improved.

Third Embodiment

In the third embodiment, the plate member 95 is different, but the other configurations are the same as those of the first embodiment.

Figure 10:
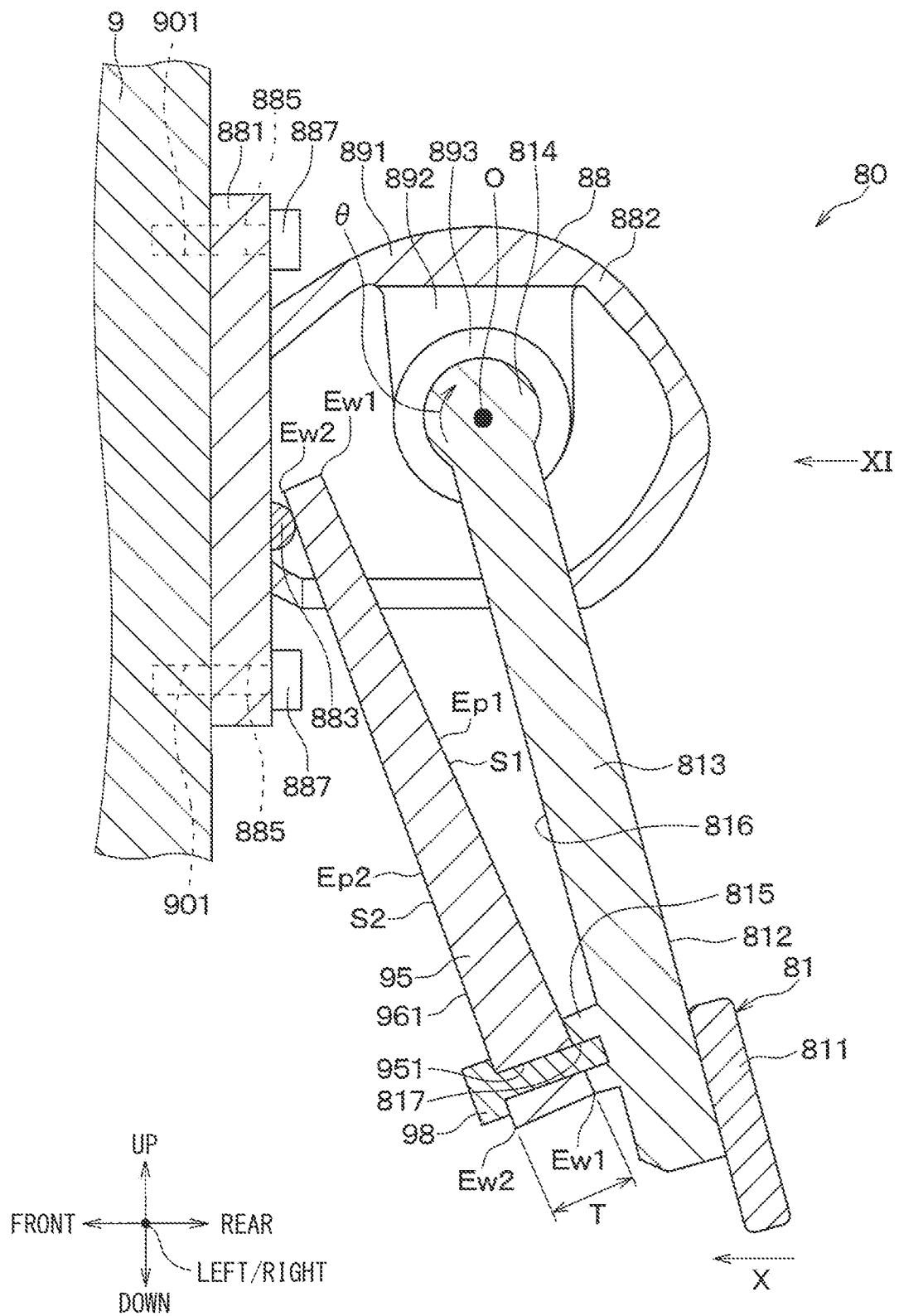
FIG. 10 is a sectional view illustrating a vehicle brake device according to a third embodiment.
Figure 11:
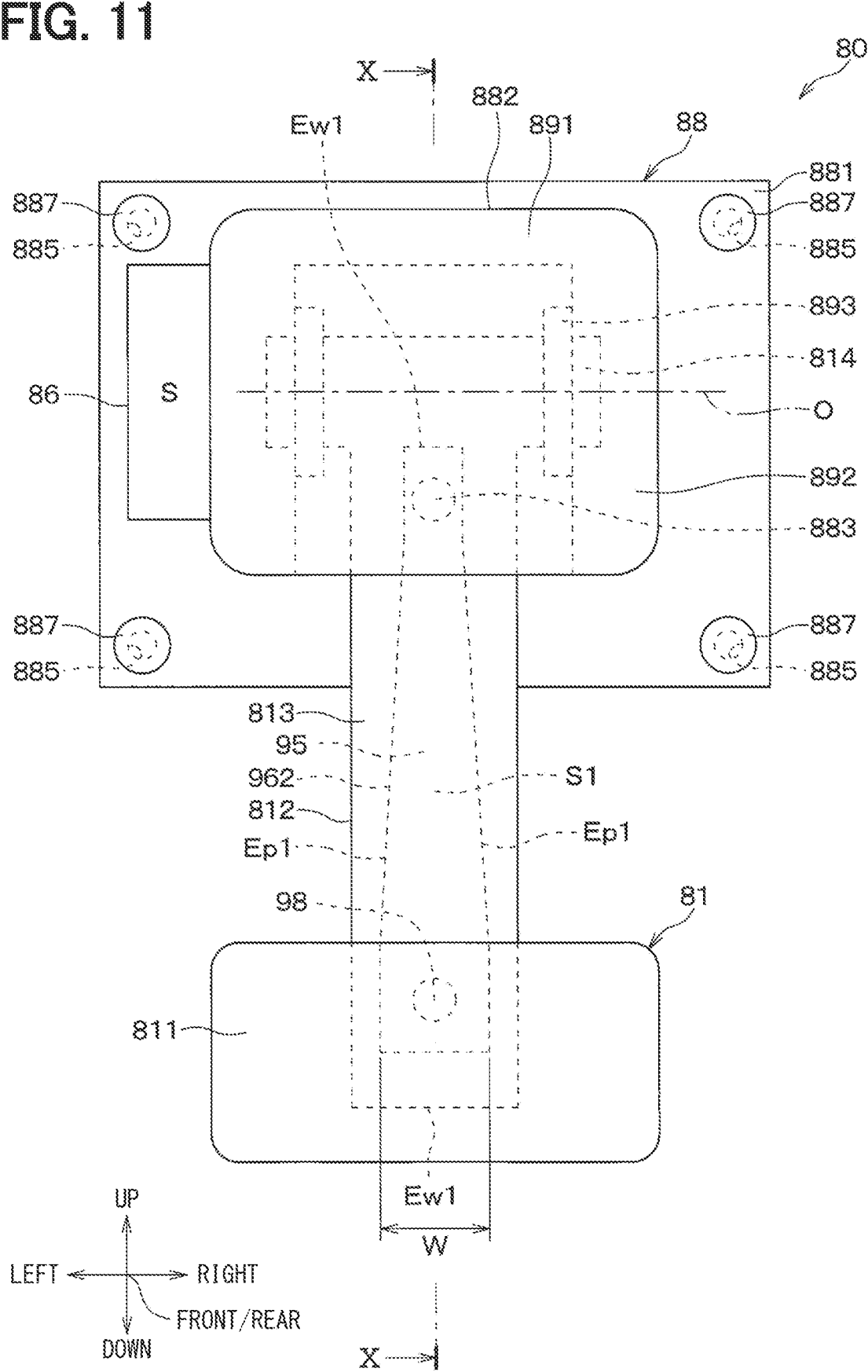
FIG. 11 is a view seen in an arrow direction XI in FIG. 10.

As shown in FIGS. 10 and 11, the plate member 95 further includes a plate thickness inclined portion 961 and a plate width inclined portion 962.

As shown in FIG. 10, the plate thickness inclined portion 961 causes the first longitudinal side Ep1, the second longitudinal side Ep2, the first longitudinal surface S1 and the second longitudinal surface S2 to be inclined with respect to the thickness direction of the plate member 95. As a result, the plate thickness T of the plate member 95 decreases as extending from the end of the plate member 95 adjacent to the lever fixing portion 98 toward the end of the plate member 95 adjacent to the housing contact portion 883. Therefore, the plate thickness T of the plate member 95 adjacent to the lever fixing portion 98 is larger than the plate thickness T of the plate member 95 adjacent to the housing contact portion 883.

Further, as shown in FIG. 11, the plate width W of the plate member 95 is constant in the vicinity of the end portion of the plate member 95 adjacent to the lever fixing portion 98. Due to the plate width inclined portion 962, the first longitudinal side Ep1 and the second longitudinal side Ep2 are inclined with respect to the width direction in the range between the end portion of the plate member 95 adjacent to the lever fixing portion 98 and the end portion of the plate member 95 adjacent to the housing contact portion 883. As a result, the plate width W of the plate member 95 changes. Specifically, the plate width W of the plate member 95 decreases as extending from the lever fixing portion 98 toward the housing contact portion 883. Therefore, the plate width W of the plate member 95 adjacent to the lever fixing portion 98 is larger than the plate width W of the plate member 95 adjacent to the housing contact portion 883. Further, the plate width W of the plate member 95 is constant in the vicinity of the end portion of the plate member 95 adjacent to the housing contact portion 883.

The third embodiment also achieves the same effects as achieved by the first embodiment.

As described above, the lower side of the plate member 95 and the lever convex portion 815 are fixed. Further, the upper side of the plate member 95 and the housing contact portion 883 come into contact with each other. Therefore, the plate member 95 is a cantilever beam having a fixed end on the lower side of the plate member 95 and a free end on the upper side of the plate member 95. When the brake pedal 81 is operated by the pedaling force of the driver of the vehicle 6, the upper side of the plate member 95 and the housing contact portion 883 come into contact with each other. At this time, the bending moment applied to the lever fixing portion 98 of the plate member 95 is relatively large.

In the third embodiment, the plate thickness T of the plate member 95 adjacent to the lever fixing portion 98 is larger than the plate thickness T of the plate member 95 adjacent to the housing contact portion 883. Further, the plate width W of the plate member 95 adjacent to the lever fixing portion 98 is larger than the plate width W of the plate member 95 adjacent to the housing contact portion 883. As a result, the moment of inertia of area on the lever fixing portion 98 of the plate member 95 becomes relatively large, so that the stress applied to the lever fixing portion 98 of the plate member 95 can be relatively reduced. Therefore, the plate member 95 is less likely to be plastically deformed and damaged.

Further, the plate thickness T of the plate member 95 adjacent to the housing contact portion 883 is smaller than the plate thickness T of the plate member 95 adjacent to the lever fixing portion 98. Further, the plate width W of the plate member 95 adjacent to the housing contact portion 883 is smaller than the plate width W of the plate member 95 adjacent to the lever fixing portion 98. As a result, the end portion of the plate member 95 adjacent to the housing contact portion 883 is easily elastically deformed, and is easy to bend. Therefore, the reaction force Fr is likely to occur.

Fourth Embodiment

In the fourth embodiment, the plate member 95 is different, but the other configurations are the same as those of the first embodiment.

Figure 12:
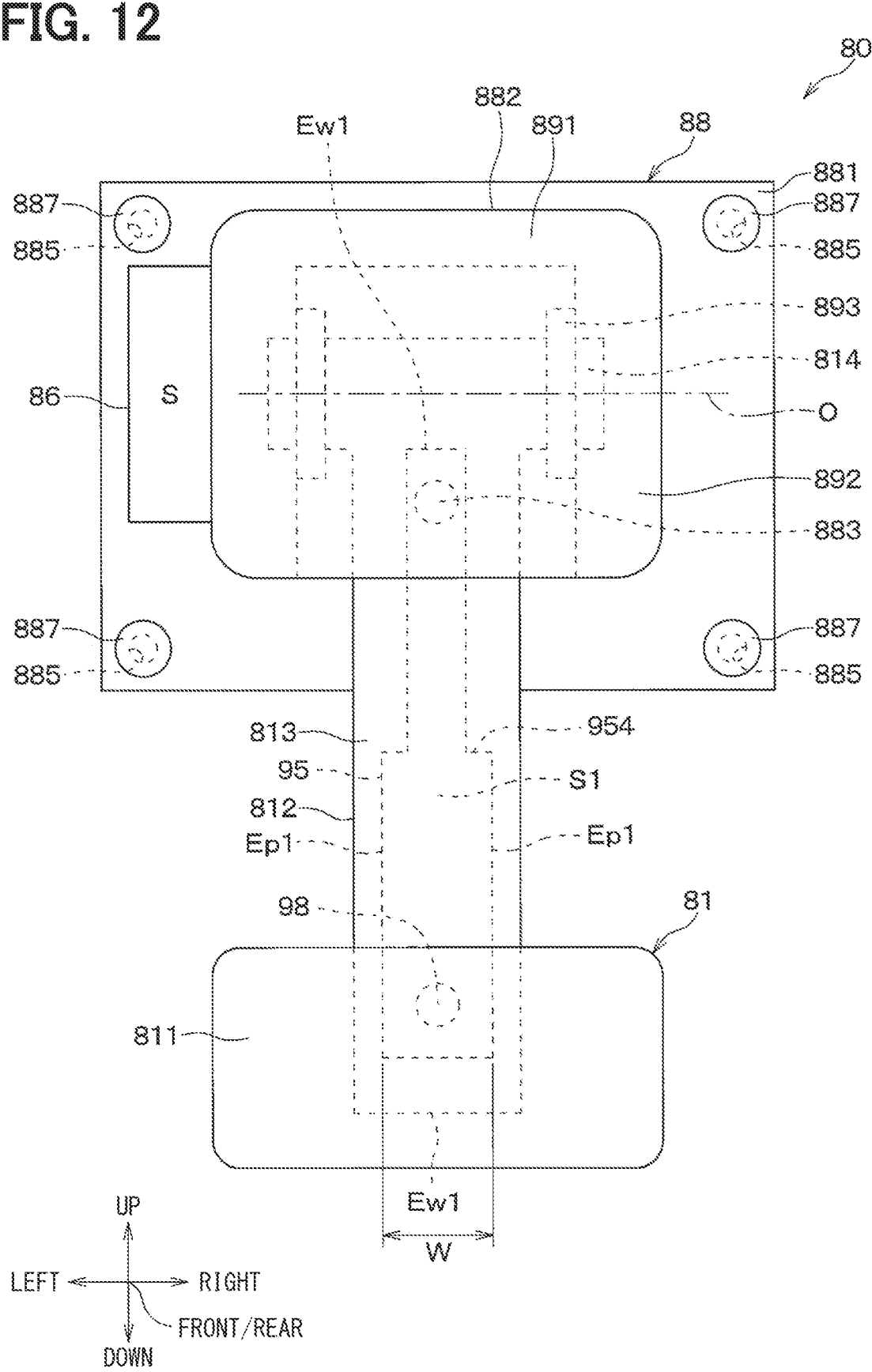
FIG. 12 is a front view illustrating a vehicle brake device according to a fourth embodiment.

As shown in FIG. 12, the plate member 95 further has a step portion 954. The step portion 954 is formed between the end portion of the plate member 95 adjacent to the lever fixing portion 98 and the end portion of the plate member 95 adjacent to the housing contact portion 883. Due to the step portion 954, the plate width W of the plate member 95 adjacent to the lever fixing portion 98 is larger than the plate width W of the plate member 95 adjacent to the housing contact portion 883.

The fourth embodiment also achieves the same effects as achieved by the first embodiment. Further, in the fourth embodiment, the plate width W of the plate member 95 adjacent to the lever fixing portion 98 is larger than the plate width W of the plate member 95 adjacent to the housing contact portion 883, due to the step portion 954. As a result, a side of the plate member 95 adjacent to the housing contact portion 883 is easily bent. When the lever rotating portion 814 is rotated, the lever front surface 816 and the first longitudinal surface S1 of the plate member 95 are easily separated from each other. Therefore, when the lever portion 812 rotates, it is possible to restrict the lever portion 812 from interfering with the plate member 95.

Fifth Embodiment

In the fifth embodiment, the plate member 95 is different, but the other configurations are the same as those of the first embodiment.

Figure 13:
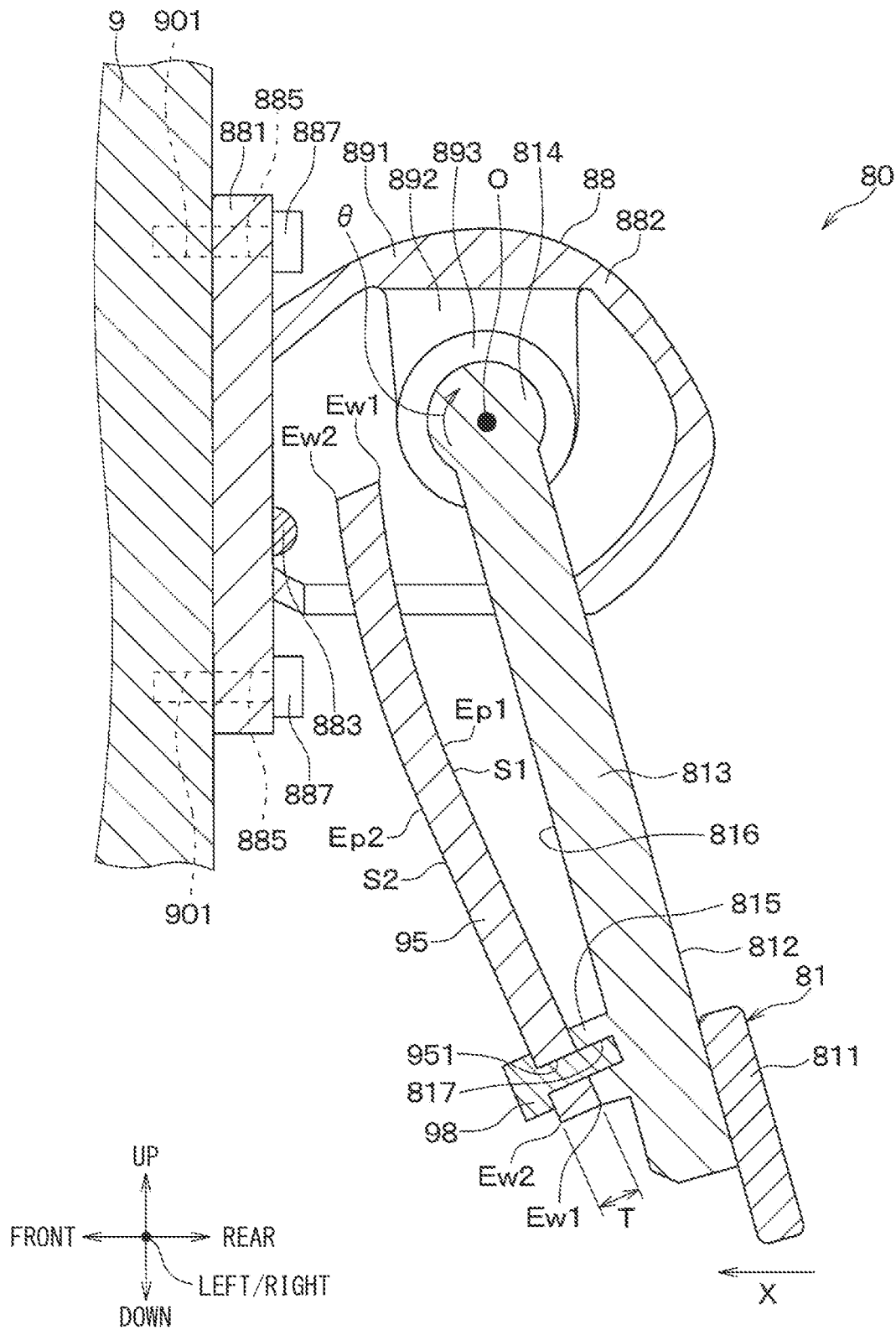
FIG. 13 is a sectional view illustrating a vehicle brake device according to a fifth embodiment.

As shown in FIG. 13, the first longitudinal surface S1 and the second longitudinal surface S2 of the plate member 95 have a curved part in the initial state before the pedal portion 811 is operated by the pedaling force of the driver of the vehicle 6. For example, the plate member 95 is curved so that the curvatures of the first longitudinal surface S1 and the second longitudinal surface S2 are constant. The first longitudinal surface S1 and the second longitudinal surface S2 may be undulated in the initial state before the pedal portion 811 is operated by the pedaling force of the driver of the vehicle 6.

Figure 14:
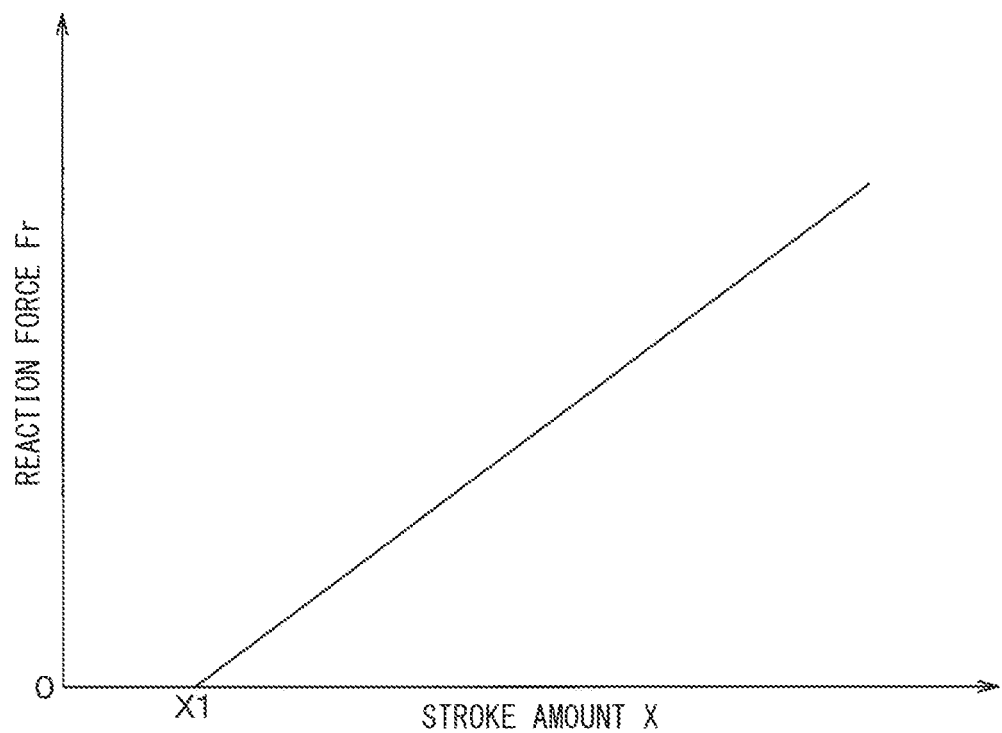
FIG. 14 is a diagram illustrating a relationship between a stroke amount and a reaction force.

Further, the plate member 95 is in non-contact with the housing contact portion 883 before the brake pedal 81 is operated by the pedaling force of the driver of the vehicle 6. As a result, when the brake pedal 81 is operated by the pedaling force of the driver of the vehicle 6, as shown in FIG. 14, when the stroke amount X is zero or more and less than X1, the plate member 95 and the housing contact portion 883 are not in contact with each other. At this time, since the plate member 95 does not bend, the reaction force Fr is zero. Further, when the stroke amount X is X1 or more, the plate member 95 and the housing contact portion 883 come into contact with each other. At this time, since the plate member 95 bends, the reaction force Fr becomes more than or equal to zero. It should be noted that X1 is set by, for example, the distance from the plate member 95 to the housing contact portion 883 in the front-rear direction.

The fifth embodiment also achieves the same effects as achieved by the first embodiment. Further, in the fifth embodiment, the first longitudinal surface S1 and the second longitudinal surface S2 of the plate member 95 are curved surfaces in the initial state. This makes it relatively easy to attach the plate member 95, so that the flexibility in the arrangement of the brake pedal 81, the housing 88, and the plate member 95 can be relatively improved.

Sixth Embodiment

In the sixth embodiment, the plate member 95 is different, specifically, the ideas of the second embodiment and the third embodiment are combined, but the other configurations are the same as those of the second embodiment.

Figure 15:
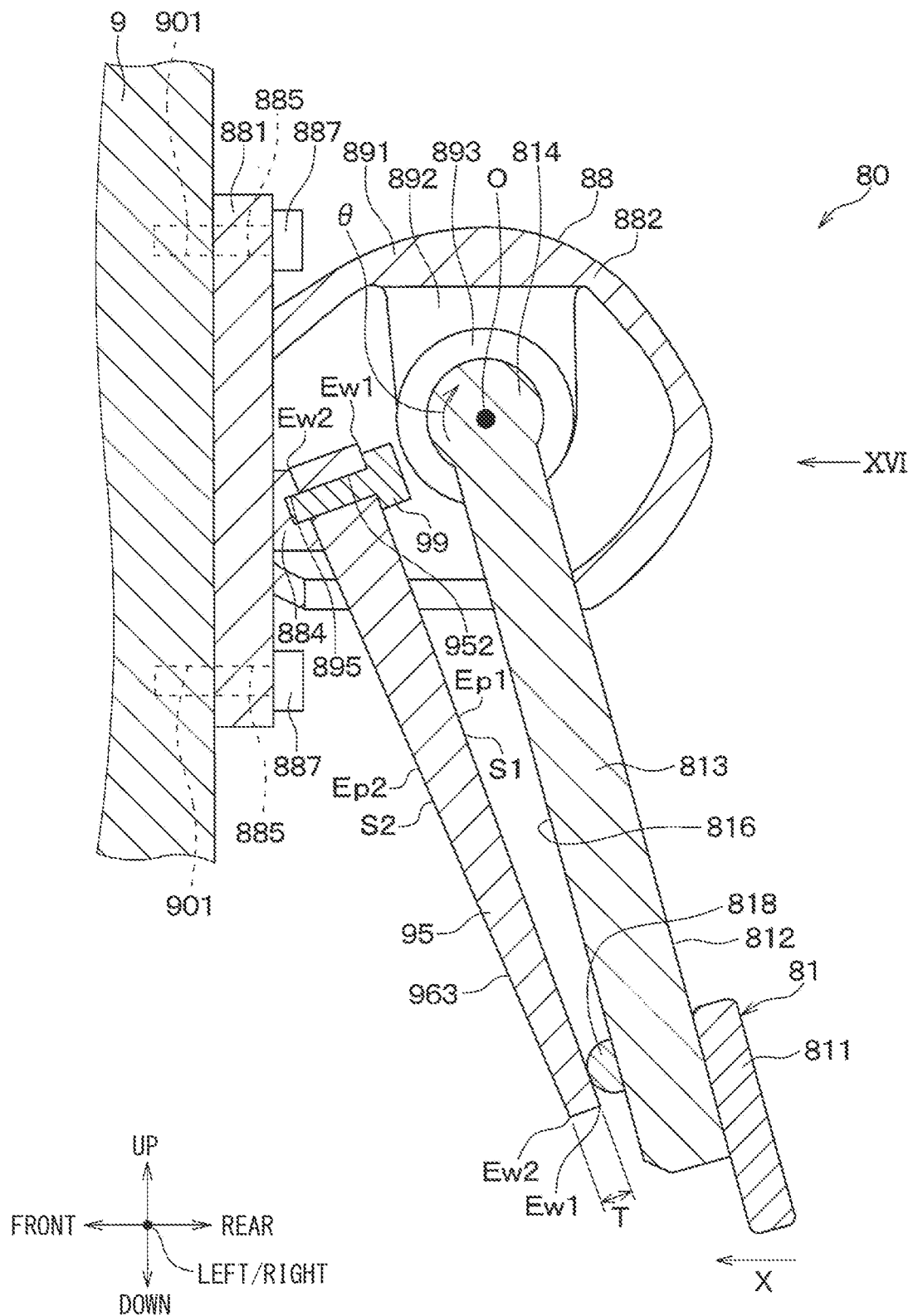
FIG. 15 is a sectional view illustrating a vehicle brake device according to a sixth embodiment.
Figure 16:
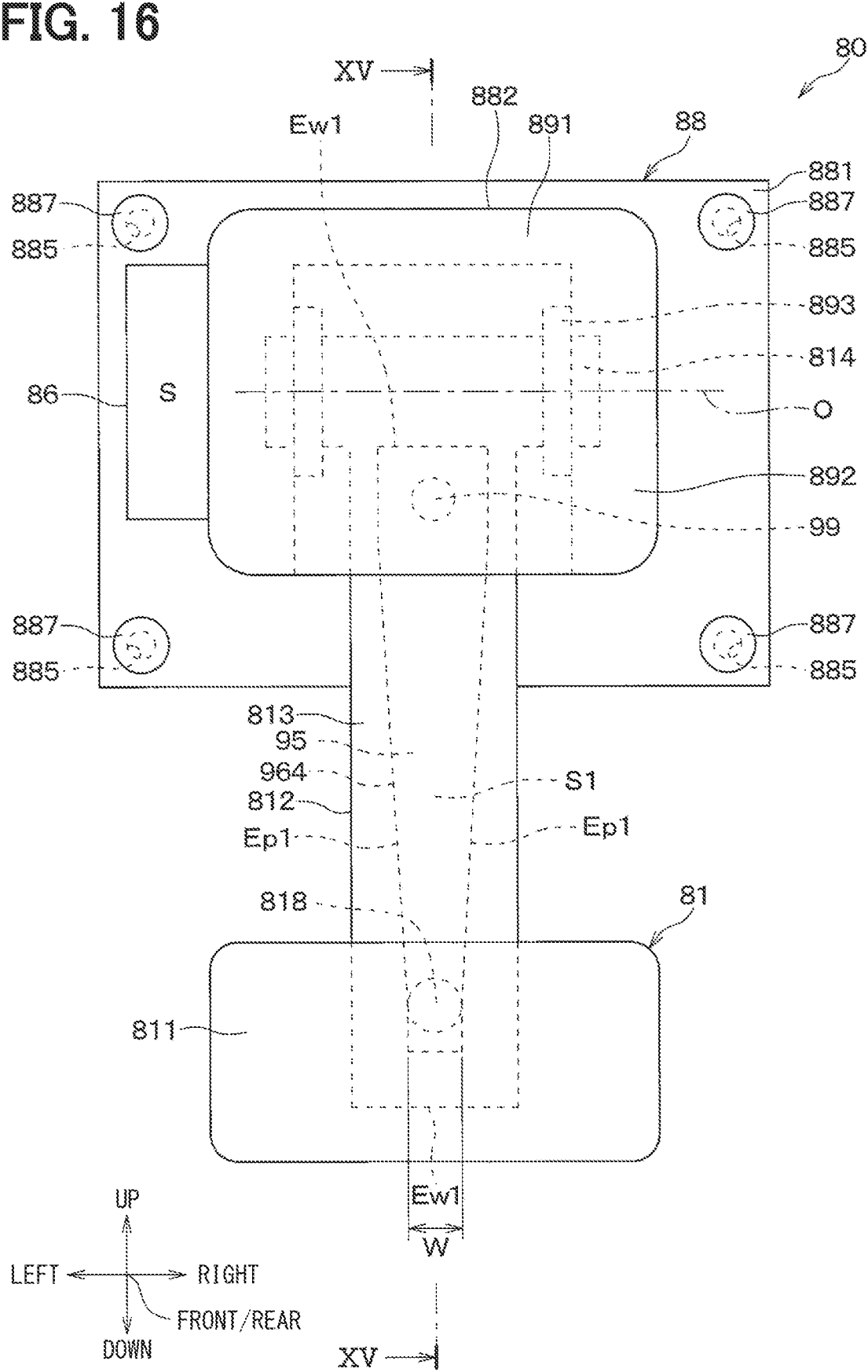
FIG. 16 is a view seen in an arrow direction XVI in FIG. 15.

As shown in FIGS. 15 and 16, the plate member 95 further includes a plate thickness inclined portion 963 and a plate width inclined portion 964.

As shown in FIG. 15, the plate thickness inclined portion 963 causes the first longitudinal side Ep1, the second longitudinal side Ep2, the first longitudinal surface S1 and the second longitudinal surface S2 to be inclined with respect to the thickness direction of the plate member 95. As a result, the plate thickness T of the plate member 95 is made smaller as extending from the end portion of the plate member 95 adjacent to the housing fixing portion 99 toward the end portion of the plate member 95 adjacent to the lever contact portion 818. Therefore, the plate thickness T of the plate member 95 adjacent to the housing fixing portion 99 is larger than the plate thickness T of the plate member 95 adjacent to the lever contact portion 818.

Further, as shown in FIG. 16, the plate width W of the plate member 95 is constant in the vicinity of the end portion of the plate member 95 adjacent to the housing fixing portion 99. Further, due to the plate width inclined portion 964, the first longitudinal side Ep1 and the second longitudinal side Ep2 are inclined with respect to the width direction in the area between the end portion of the plate member 95 adjacent to the housing fixing portion 99 and the end portion of the plate member 95 adjacent to the lever contact portion 818. As a result, the plate width W of the plate member 95 decreases as extending from the housing fixing portion 99 toward the lever contact portion 818. Therefore, the plate width W of the plate member 95 adjacent to the housing fixing portion 99 is larger than the plate width W of the plate member 95 adjacent to the lever contact portion 818. Further, the plate width W of the plate member 95 is constant in the vicinity of the end portion of the plate member 95 adjacent to the lever contact portion 818.

Also in the sixth embodiment, effects similar to those of the second embodiment and the third embodiment are obtained.

Seventh Embodiment

In the seventh embodiment, the plate member 95 is different, specifically, the ideas of the second embodiment and the fourth embodiment are combined, but the other configurations are the same as those of the second embodiment.

Figure 17:
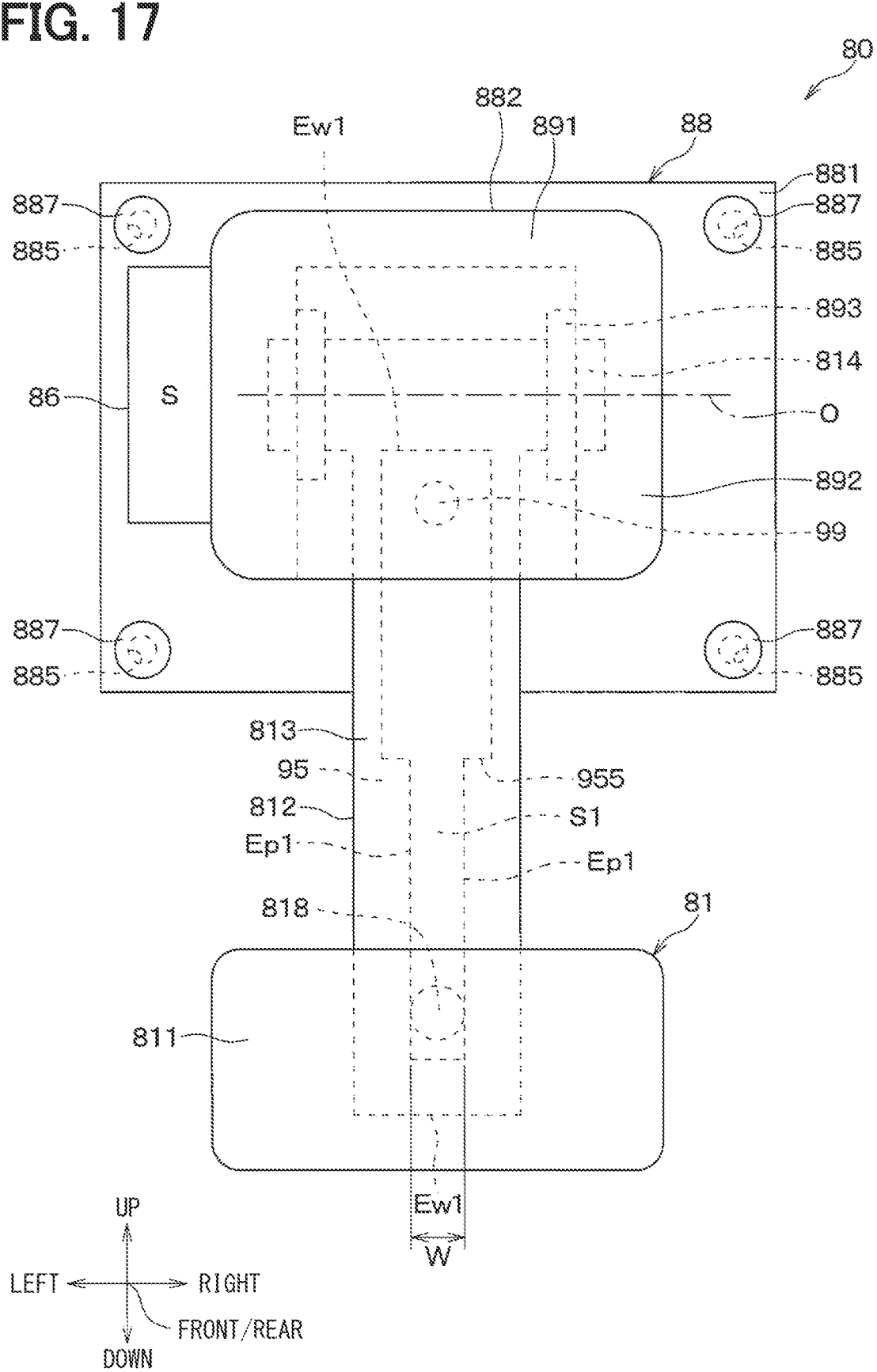
FIG. 17 is a front view illustrating a vehicle brake device according to a seventh embodiment.

As shown in FIG. 17, the plate member 95 further has a step portion 955. The step portion 955 is formed between the end portion of the plate member 95 adjacent to the housing fixing portion 99 and the end portion adjacent to the lever contact portion 818. Due to the step portion 955, the plate width W of the plate member 95 adjacent to the housing fixing portion 99 is larger than the plate width W of the plate member 95 adjacent to the lever contact portion 818.

Also in the seventh embodiment, effects similar to those of the second embodiment and the fourth embodiment are obtained.

Eighth Embodiment

In the eighth embodiment, the plate member 95 is different, specifically, the ideas of the second embodiment and the fifth embodiment are combined, but the other configurations are the same as those of the second embodiment.

Figure 18:
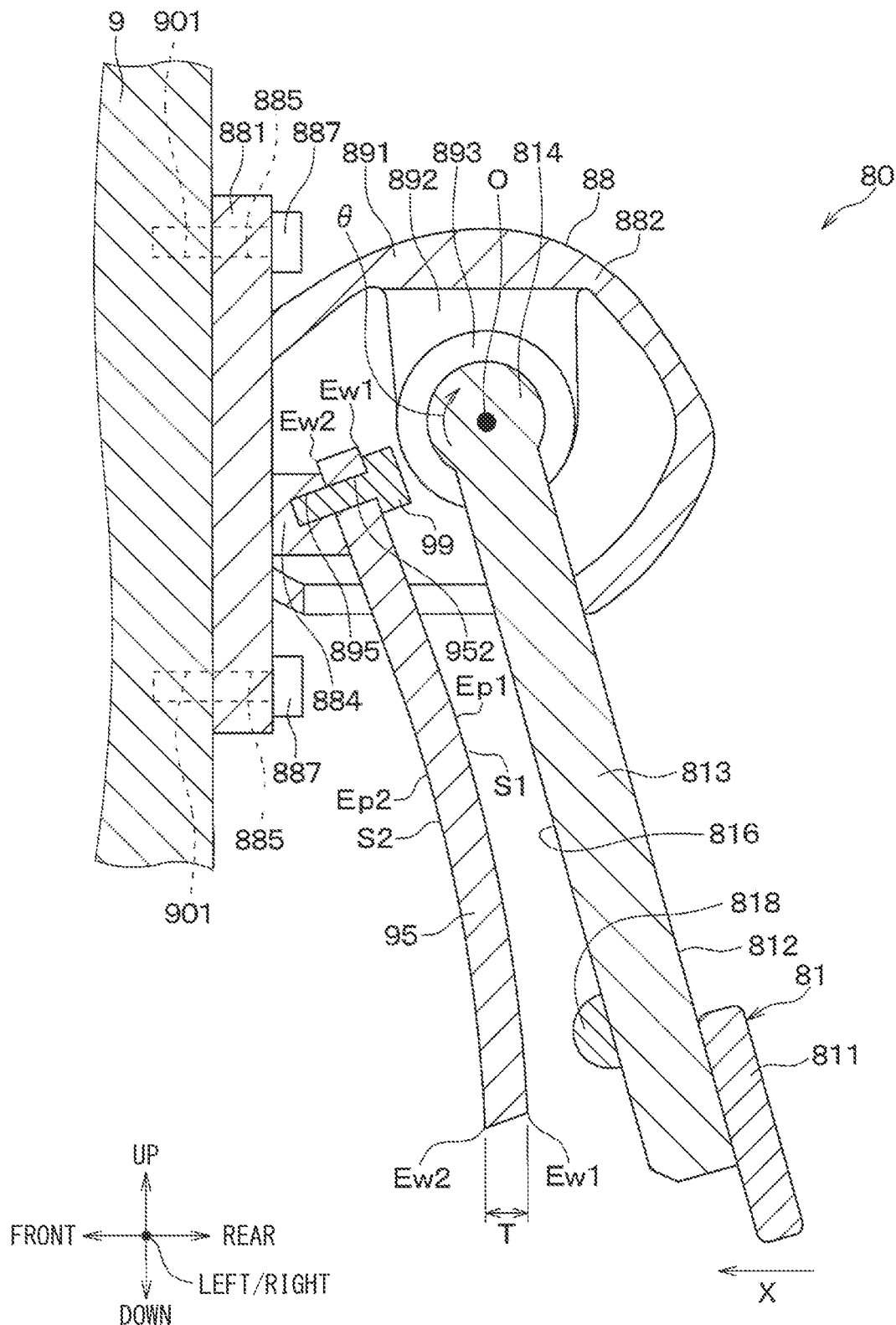
FIG. 18 is a sectional view illustrating a vehicle brake device according to an eighth embodiment.

As shown in FIG. 18, the first longitudinal surface S1 and the second longitudinal surface S2 of the plate member 95 have a curved part in the initial state before the pedal portion 811 is operated by the pedaling force of the driver of the vehicle 6 in the same manner as described above. For example, similarly to the above, the curvatures of the first longitudinal surface S1 and the second longitudinal surface S2 are constant.

Figure 19:
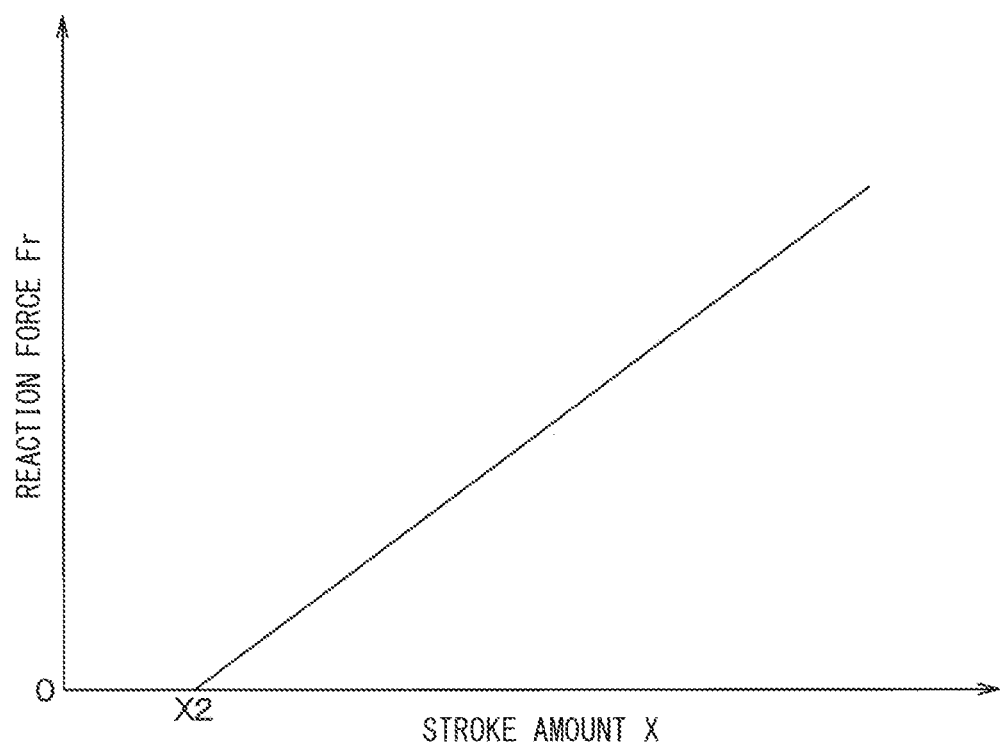
FIG. 19 is a diagram illustrating a relationship between a stroke amount and a reaction force.

Further, the plate member 95 is in non-contact with the lever contact portion 818 before the brake pedal 81 is operated by the pedaling force of the driver of the vehicle 6. As a result, as shown in FIG. 19, when the brake pedal 81 is operated by the pedaling force of the driver of the vehicle 6, if the stroke amount X is zero or more and less than X2, the plate member 95 and the lever contact portion 818 are not in contact with each other. At this time, since the plate member 95 does not bend, the reaction force Fr is zero. Further, when the stroke amount X is X2 or more, the plate member 95 and the lever contact portion 818 come into contact with each other. At this time, since the plate member 95 bends, the reaction force Fr becomes more than or equal to zero. Note that X2 is set according to the distance from the plate member 95 to the lever contact portion 818 in the front-rear direction.

Also in the eighth embodiment, the same effects as those of the second embodiment and the fifth embodiment are obtained.

Ninth Embodiment

In the ninth embodiment, the brake pedal 81, the housing 88, and the plate member 95 are different, but the other configurations are the same as those of the first embodiment.

The brake pedal 81 has the pedal portion 811 and the lever portion 812, as in the first embodiment. Further, the lever portion 812 includes the lever plate portion 813, the lever rotating portion 814, and the lever convex portion 815, as in the first embodiment.

Figure 20:
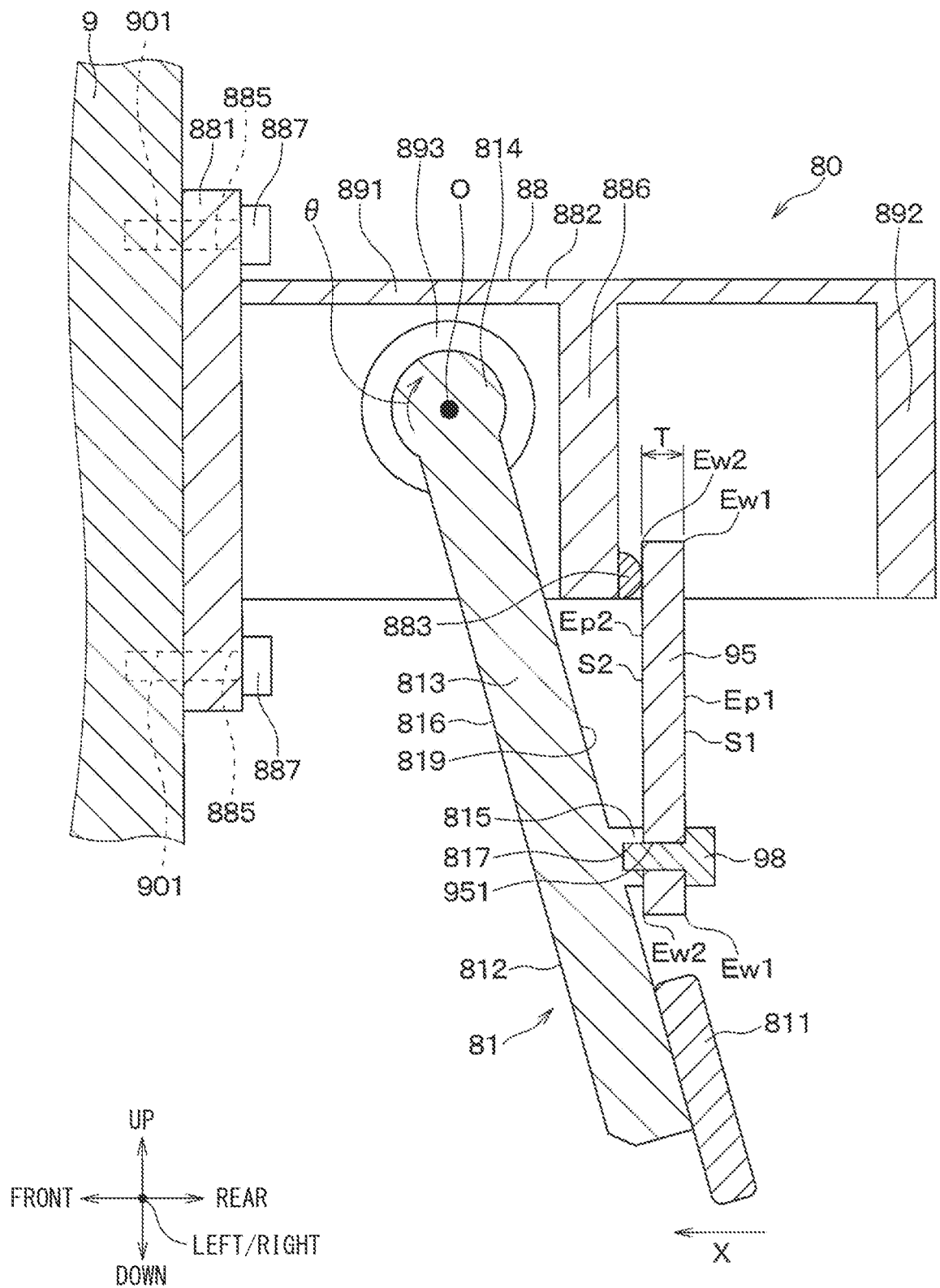
FIG. 20 is a sectional view illustrating a vehicle brake device according to a ninth embodiment.

As shown in FIG. 20, the lever convex portion 815 is connected to the lever rear surface 819 of the lever plate portion 813 opposing the pedal portion 811. Further, the lever convex portion 815 projects from the lever rear surface 819 toward the lower side of the plate member 95, specifically, toward the rear from the lever rear surface 819.

The housing 88 further has a housing partition 886 in addition to the panel mounting portion 881, the housing portion 882 and the housing contact portion 883 similar to the first embodiment.

The housing partition 886 is connected to the housing bottom 891 and extends downward from the housing bottom 891. As a result, the housing partition 886 partitions the inside of the housing cylinder portion 892.

The housing contact portion 883 is formed separately from the panel mounting portion 881, the housing portion 882, and the housing partition 886. Further, the housing contact portion 883 is connected to the housing partition 886. Further, the housing contact portion 883 projects from the housing partition 886 toward the upper side of the plate member 95, specifically, toward the rear from the housing partition 886. As a result, the housing contact portion 883 comes into contact with the upper side of the plate member 95.

The plate member 95 is arranged on the rear side of the lever plate portion 813. As a result, the first longitudinal surface S1 of the plate member 95 faces the rear side of the housing cylinder portion 892. Further, the second longitudinal surface S2 of the plate member 95 faces the lever rear surface 819 and the housing contact portion 883. Further, the size of the lever rear surface 819 is larger than the size of the second longitudinal surface S2.

Figure 21:
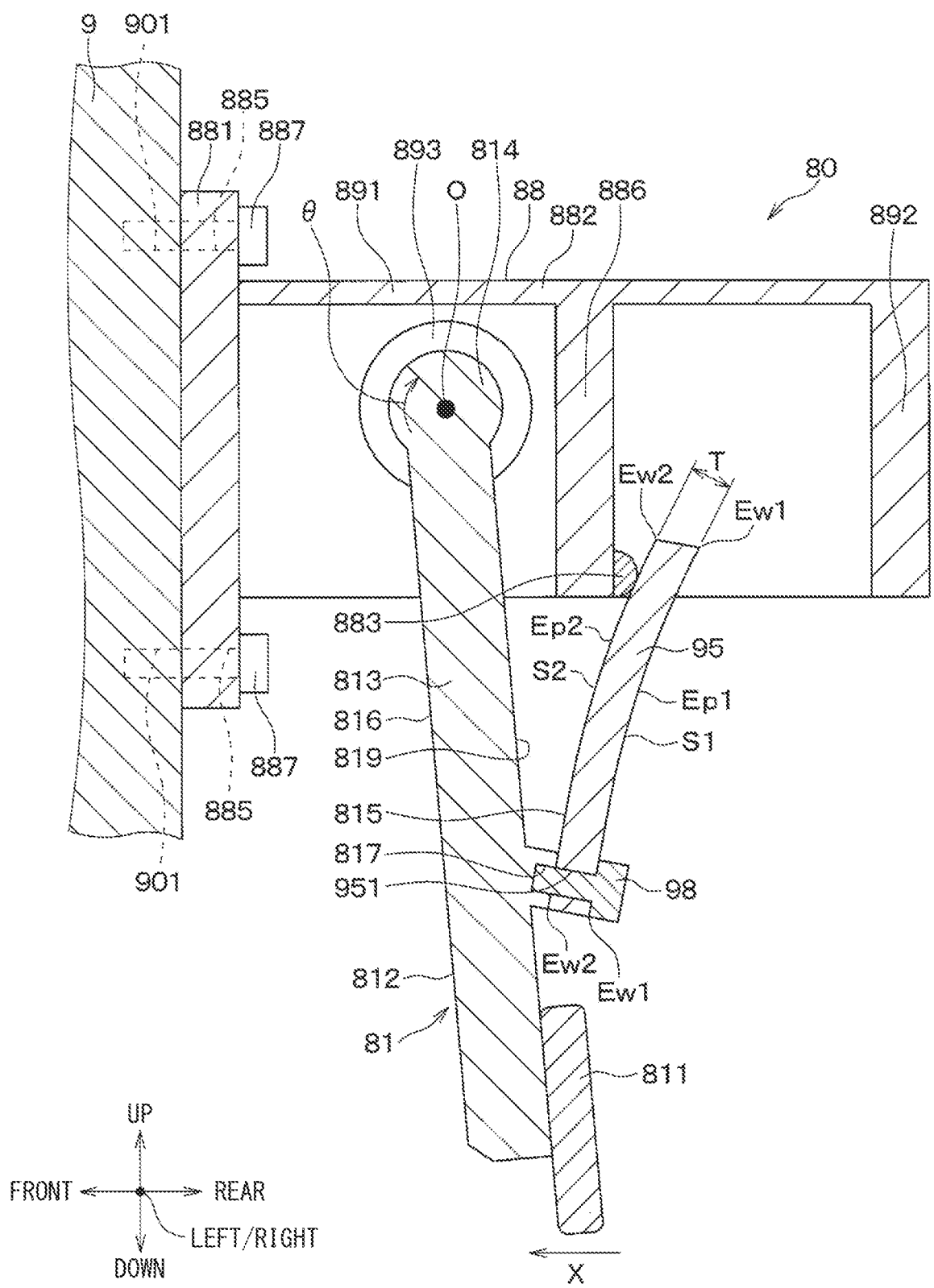

The upper side of the plate member 95 and the housing contact portion 883 come into contact with each other. Therefore, the plate member 95 is a cantilever beam having a fixed end on the lower side of the plate member 95 and a free end on the upper side of the plate member 95. Therefore, when the brake pedal 81 is operated by the pedaling force of the driver of the vehicle 6, the plate member 95 receives a load in the thickness direction of the plate member 95 from the housing contact portion 883 that contacts the plate member 95. As a result, as shown in FIG. 21, the plate member 95 bends. Therefore, a restoring force is generated in the plate member 95. Due to this restoring force, a reaction force Fr with respect to the lever portion 812 is generated.

The ninth embodiment also achieves the same effects as achieved by the first embodiment.

Tenth Embodiment

In the tenth embodiment, the brake pedal 81, the housing 88, and the plate member 95 are different, but the other configurations are the same as those of the first embodiment.

Figure 22:
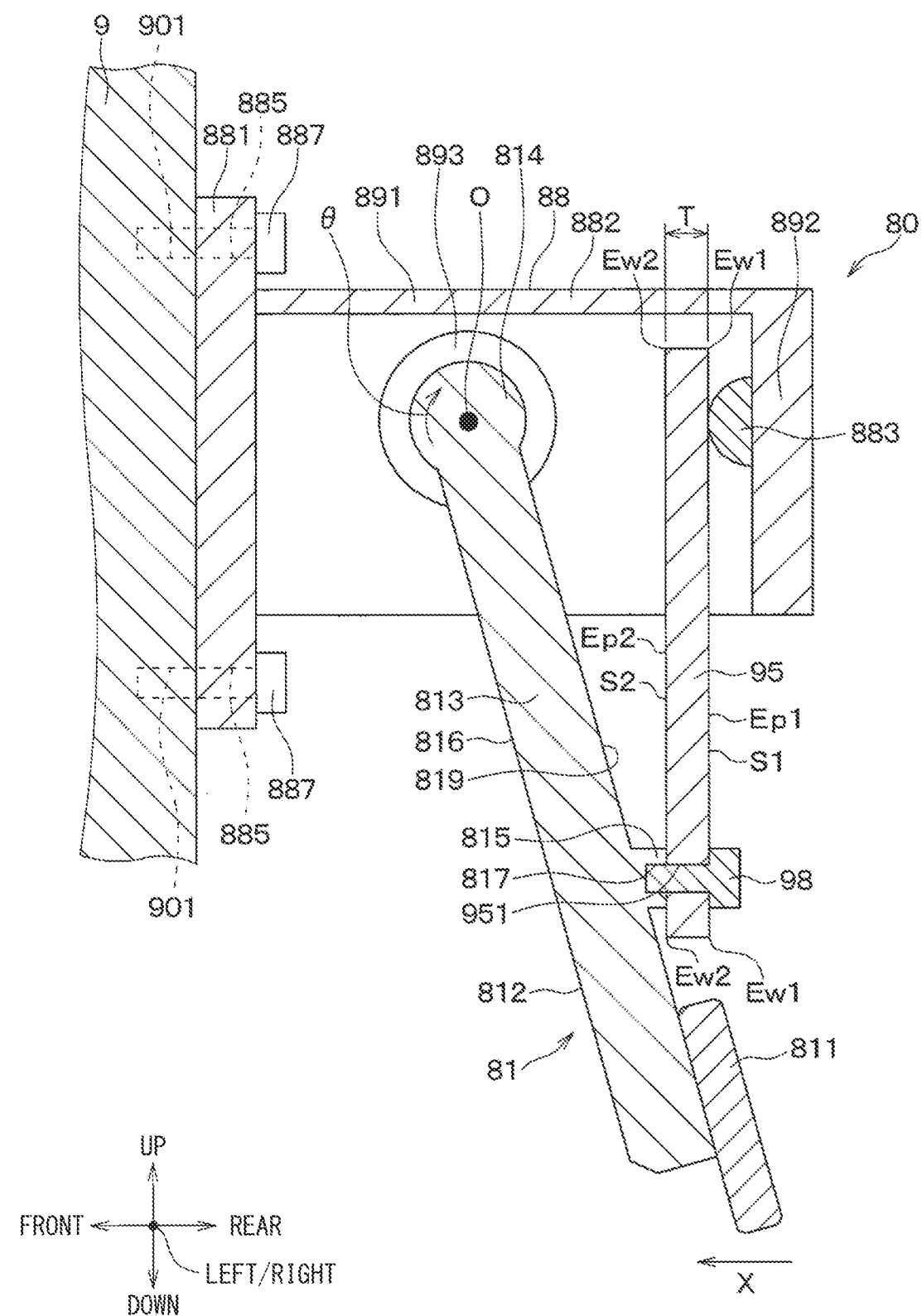
FIG. 22 is a sectional view illustrating a vehicle brake device according to a tenth embodiment.

As shown in FIG. 22, the lever convex portion 815 of the brake pedal 81 is connected to the lever rear surface 819 of the lever plate portion 813 opposing the pedal portion 811, as in the ninth embodiment. Further, the lever convex portion 815 projects from the lever rear surface 819 toward the lower side of the plate member 95, specifically, toward the rear from the lever rear surface 819.

The housing contact portion 883 of the housing 88 is connected to the rear side of the housing cylinder portion 892. Further, the housing contact portion 883 projects from the rear side of the housing cylinder portion 892 toward the upper side of the plate member 95, specifically, from the rear side of the housing cylinder portion 892 toward the front. As a result, the housing contact portion 883 comes into contact with the upper side of the plate member 95.

The plate member 95 is arranged on the rear side of the lever plate portion 813. As a result, the first longitudinal surface S1 of the plate member 95 faces the rear side of the housing contact portion 883 and the housing cylinder portion 892. Further, the second longitudinal surface S2 of the plate member 95 faces the lever rear surface 819. Further, the size of the lever rear surface 819 is larger than the size of the second longitudinal surface S2.

Figure 23:
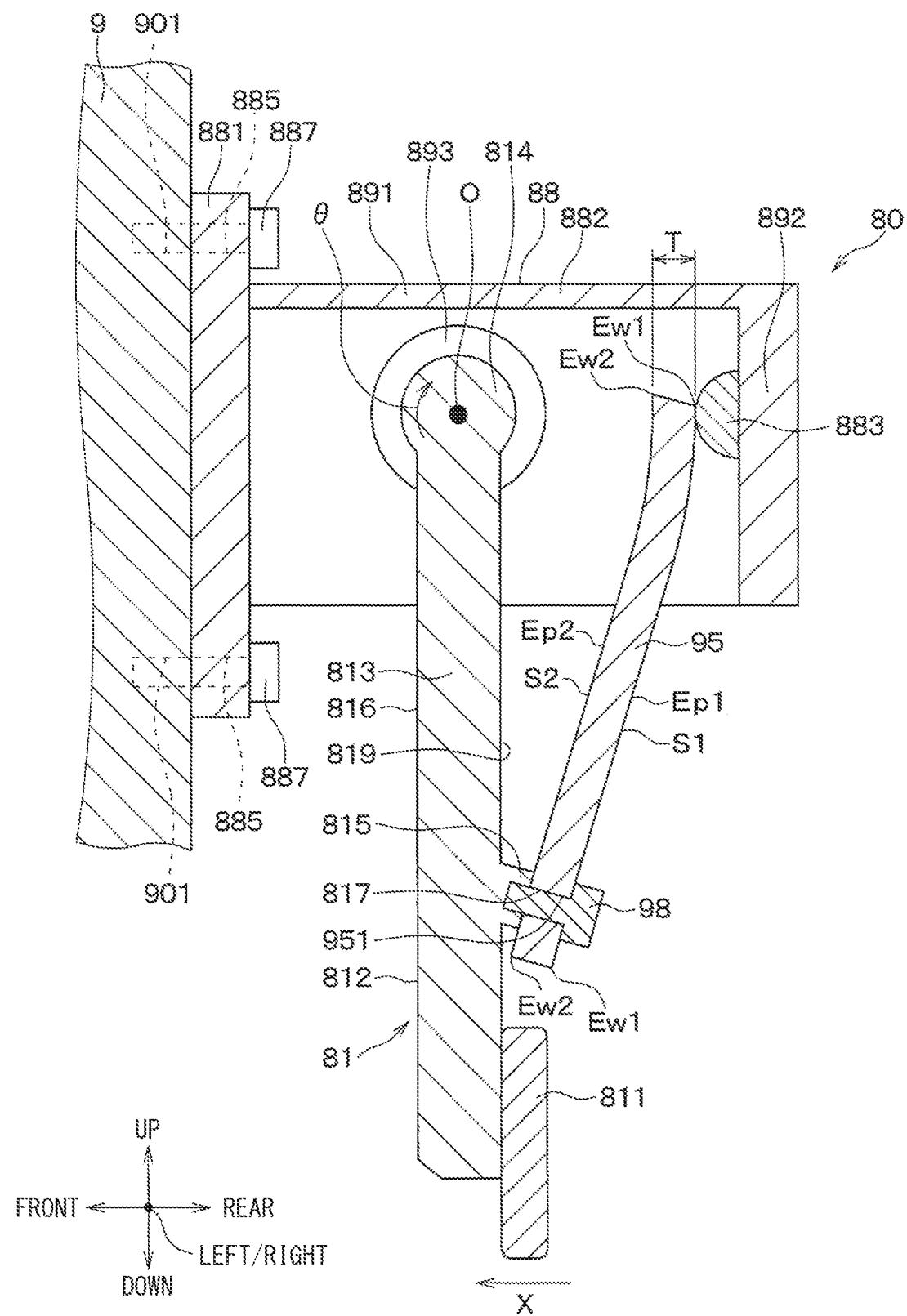

The upper side of the plate member 95 and the housing contact portion 883 come into contact with each other. Therefore, the plate member 95 is a cantilever beam having a fixed end on the lower side of the plate member 95 and a free end on the upper side of the plate member 95. Therefore, when the brake pedal 81 is operated by the pedaling force of the driver of the vehicle 6, the plate member 95 bends as shown in FIG. 23, and a reaction force Fr with respect to the lever portion 812 is generated.

The tenth embodiment also achieves the same effects as achieved by the first embodiment.

Other Embodiments

The present disclosure is not limited to the embodiments, and the embodiments can be appropriately modified. In each of the embodiments, it is obvious that the elements constituting the embodiment are not necessarily essential, except for a case where it is explicitly stated that the elements are particularly essential, a case where the elements are considered to be obviously essential in principle, and the like.

(1) In the embodiment, the vehicle brake device 80 includes the stroke sensor 86. The number of stroke sensors 86 is not limited to one, and may be two or more.

(2) In the embodiment, the housing contact portion 883 is formed separately from the panel mounting portion 881 and the housing portion 882. Alternatively, the housing contact portion 883 may be integrally formed with the panel mounting portion 881 and the housing portion 882. Further, the lever contact portion 818 is formed separately from the lever plate portion 813 and the lever rotating portion 814. Alternatively, the lever contact portion 818 may be integrally formed with the lever plate portion 813 and the lever rotating portion 814.

(3) The second embodiment and the ninth embodiment may be combined. Specifically, the lever contact portion 818 is connected to the lever rear surface 819. In this case, the lever contact portion 818 is formed in a U shape and comes into contact with the plate member 95 so as to hook the plate member 95. Further, the housing convex portion 884 is connected to the housing partition 886, and protrudes upward from the housing partition 886 of the plate member 95. As a result, the upper side of the plate member 95 and the housing convex portion 884 come into contact with each other. The housing fixing portion 99 fixes the housing convex portion 884 and the upper side of the plate member 95. As a result, the plate member 95 is a cantilever beam having the upper side of the plate member 95 as a fixed end and the lower side of the plate member 95 as a free end. Even in such a form, the same effect as that of the second embodiment is obtained.

(4) The second embodiment and the tenth embodiment may be combined. Specifically, the lever contact portion 818 is connected to the lever rear surface 819. In this case, the lever contact portion 818 is formed in a U-shape so as to come into contact with the plate member 95. Further, the housing convex portion 884 is connected to the rear side of the housing cylinder portion 892, and protrudes from the rear side of the housing cylinder portion 892 toward the upper side of the plate member 95. As a result, the upper side of the plate member 95 and the housing convex portion 884 come into contact with each other. The housing fixing portion 99 fixes the housing convex portion 884 and the upper side of the plate member 95. As a result, the plate member 95 is a cantilever beam having the upper side of the plate member 95 as a fixed end and the lower side of the plate member 95 as a free end. Even in such a form, the same effect as that of the second embodiment is obtained.

(5) In the embodiment, the lever portion 812 includes the lever plate portion 813. However, the lever portion 812 is not limited to being formed in a plate shape, and may be formed in a rod shape such as a cylinder. Therefore, the lever front surface 816 and the lever rear surface 819 are not limited to being flat, and may be curved.

(6) In the third embodiment, the plate thickness inclined portion 961 causes the entire first longitudinal surface S1 and second longitudinal surface S2 to be inclined toward the thickness direction of the plate member 95. However, the entire first longitudinal surface S1 and second longitudinal surface S2 are not limited to being inclined toward the thickness direction of the plate member 95. For example, the plate thickness T of the plate member 95 may be constant in the vicinity of the end portion of the plate member 95 adjacent to the lever fixing portion 98. Further, due to the plate thickness inclined portion 961, the first longitudinal surface S1 and the second longitudinal surface S2 may be inclined toward the thickness direction in the area between the end portion of the plate member 95 adjacent to the lever fixing portion 98 and the end portion adjacent to the housing contact portion 883. Further, the plate thickness T of the plate member 95 may be constant in the vicinity of the end portion of the plate member 95 adjacent to the housing contact portion 883. In this way, at least a part of the first longitudinal surface S1 and the second longitudinal surface S2 may be inclined toward the thickness direction of the plate member 95 by the plate thickness inclined portion 961.

Further, in the sixth embodiment, the plate thickness inclined portion 963 causes the entire first longitudinal surface S1 and second longitudinal surface S2 to be inclined toward the thickness direction of the plate member 95. Also in the sixth embodiment, similarly to the above, the entire first longitudinal surface S1 and second longitudinal surface S2 are not limited to being inclined toward the thickness direction of the plate member 95. For example, the plate thickness T of the plate member 95 may be constant in the vicinity of the end portion of the plate member 95 adjacent to the housing fixing portion 99. Further, due to the plate thickness inclined portion 963, the first longitudinal side Ep1 and the second longitudinal side Ep2 may be inclined toward the thickness direction in the area between the end portion of the plate member 95 adjacent to the housing fixing portion 99 and the end portion of the plate member 95 adjacent to the lever contact portion 818. Further, the plate thickness T of the plate member 95 may be constant in the vicinity of the end portion of the plate member 95 adjacent to the lever contact portion 818. In this way, at least a part of the first longitudinal surface S1 and the second longitudinal surface S2 may be inclined toward the thickness direction of the plate member 95 by the plate thickness inclined portion 963.

(7) In the fourth embodiment, due to the step portion 954, the plate width W of the plate member 95 adjacent to the lever fixing portion 98 is larger than the plate width W of the plate member 95 adjacent to the housing contact portion 883. The step portion 954 may make the plate thickness T of the plate member 95 adjacent to the lever fixing portion 98 larger than the plate thickness T of the plate member 95 adjacent to the housing contact portion 883. Further, in the seventh embodiment, due to the step portion 955, the plate width W of the plate member 95 adjacent to the housing fixing portion 99 is larger than the plate width W of the plate member 95 adjacent to the lever contact portion 818. The step portion 955 may make the plate thickness T of the plate member 95 adjacent to the housing fixing portion 99 larger than the plate thickness T of the plate member 95 adjacent to the lever contact portion 818.

What is claimed is:

1. A brake device for a vehicle comprising:
   a brake pedal having a pedal portion and a lever portion that rotates about a rotation axis when the pedal portion is operated;
   a housing that rotatably supports the lever portion; and
   a plate member configured to generate a reaction force with respect to the lever portion in response to a stroke amount of the brake pedal, wherein
   the plate member has a longitudinal surface defined by a side extending in a longitudinal direction of the plate member and a side extending in a width direction of the plate member,
   the longitudinal surface is arranged so as to face the lever portion,
   the plate member is bent to generate the reaction force, when the pedal portion is operated, and
   the plate member has at least one end that is directly fixed on the housing,
   the brake device further comprises a fixing portion that fixes the plate member and the housing,
   the plate member receives a load from the lever portion, when the pedal portion is operated, so as to be bent to generate the reaction force;
   the plate member is in non-contact with the lever portion before the pedal portion is operated, and
   the plate member is in contact with the lever portion when the pedal portion is operated.

2. The brake device according to claim 1, wherein
   a length of the plate member in the width direction is larger than a length of the plate member in a thickness direction orthogonal to the longitudinal direction and the width direction, and
   the plate member receives a load in the thickness direction from the lever portion, when the pedal portion is operated, so as to be bent to generate the reaction force.

3. The brake device according to claim 1, wherein the longitudinal surface is located within a range in which a surface of the lever portion facing the longitudinal surface is projected in an operating direction of the pedal portion.

4. The brake device according to claim 1, wherein the longitudinal surface faces a surface of the lever portion opposite to the pedal portion.

5. The brake device according to claim 1, wherein
   the plate member has a thickness inclined portion that decreases a thickness of the plate member as extending away from the fixing portion.

6. The brake device according to claim 1, wherein a thickness of the plate member is constant.

7. The brake device according to claim 1, wherein
   the plate member has a width inclined portion that decreases a width of the plate member as extending away from the fixing portion.

8. The brake device according to claim 1, wherein the plate member has a step portion that makes a width of the plate member opposite to the fixing portion smaller than a width of the plate member adjacent to the fixing portion.

9. The brake device according to claim 1, wherein at least a part of the longitudinal surface is curved before the pedal portion is operated.

10. The brake device according to claim 1, wherein the fixing portion is a bolt, a welded portion, a deposition portion, or an adhesive portion.

11. The brake device according to claim 1, wherein:
the fixing portion is a bolt; and
another longitudinal surface of the plate member that faces the housing includes a hole through which the bolt passes.

12. The brake device according to claim 1, wherein:
the lever portion includes a lever contact portion that projects from a surface of the lever portion that faces the longitudinal surface toward the plate member at another end of the plate member.

13. A brake device for a vehicle comprising:
a brake pedal having a pedal portion and a lever portion that rotates about a rotation axis when the pedal portion is operated;
a housing that rotatably supports the lever portion; and
a plate member configured to generate a reaction force with respect to the lever portion in response to a stroke amount of the brake pedal, wherein
the plate member has a longitudinal surface defined by a side extending in a longitudinal direction of the plate member and a side extending in a width direction of the plate member,
the longitudinal surface is arranged so as to face the lever portion,
the plate member is bent to generate the reaction force, when the pedal portion is operated, and
the plate member has at least one end that is directly fixed on the lever portion,
the brake device further comprises a fixing portion that fixes the plate member and the lever portion,
the plate member receives a load from the housing, when the pedal portion is operated, so as to be bent to generate the reaction force;
the plate member is in non-contact with the housing before the pedal portion is operated, and
the plate member is in contact with the housing when the pedal portion is operated.

14. The brake device according to claim 13, wherein:
the fixing portion is a bolt; and
the longitudinal surface facing the lever portion includes a hole through which the bolt passes.

15. The brake device according to claim 13, wherein:
the longitudinal surface of the plate member facing the lever portion directly contacts the lever portion,
another longitudinal surface of the plate member, which is on an opposite side of the plate member as the longitudinal surface of the plate member facing the lever portion, directly contacts the housing.

16. The brake device according to claim 13, wherein:
the housing includes a housing contact portion that projects toward the plate member at another end of the plate member.

* * * * *